United States Patent
Jin et al.

(10) Patent No.: US 11,304,252 B2
(45) Date of Patent: *Apr. 12, 2022

(54) METHOD AND APPARATUS FOR PROCESSING PACKET IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Sangbum Kim, Suwon-si (KR); Soenghun Kim, Suwon-si (KR); Donggun Kim, Seoul (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,023

(22) Filed: Aug. 3, 2020

(65) Prior Publication Data

US 2020/0367305 A1  Nov. 19, 2020

Related U.S. Application Data

(63) Continuation of application No. 16/280,598, filed on Feb. 20, 2019, now Pat. No. 10,736,162, which is a
(Continued)

(30) Foreign Application Priority Data

Jun. 16, 2017 (KR) .................. 10-2017-0076681
Jul. 11, 2017 (KR) .................. 10-2017-0087850
Aug. 10, 2017 (KR) .................. 10-2017-0101911

(51) Int. Cl.
  *H04W 76/15*   (2018.01)
  *H04L 1/08*    (2006.01)
(Continued)

(52) U.S. Cl.
  CPC ............... *H04W 76/15* (2018.02); *H04L 1/08* (2013.01); *H04L 1/189* (2013.01); *H04L 1/1867* (2013.01);
(Continued)

(58) Field of Classification Search
  CPC ..... H04W 76/10; H04W 76/11; H04W 76/15; H04W 76/27; H04L 1/08; H04L 1/1867;
(Continued)

(56) References Cited

U.S. PATENT DOCUMENTS

2002/0159444 A1  10/2002  Vialen et al.
2014/0307872 A1  10/2014  Heo et al.
(Continued)

FOREIGN PATENT DOCUMENTS

CN        107342851 A     11/2017
WO        2014/136716 A1   9/2014

OTHER PUBLICATIONS

Babaei et al. U.S. Appl. No. 62/520,251, filed Jun. 15, 2017 (Year: 2017).*
(Continued)

*Primary Examiner* — Peter Chen

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of a terminal includes receiving packet duplication data radio bearer (DRB) configuration information from a base station, receiving a medium access control
(Continued)

(MAC) control element (CE) including information indicating whether packet duplication has been activated from the base station, and determining whether to activate a packet duplication bearer based on the packet duplication DRB configuration information and the MAC CE.

16 Claims, 33 Drawing Sheets

Related U.S. Application Data continuation of application No. 16/009,951, filed on Jun. 15, 2018, now Pat. No. 10,694,569.

(51) Int. Cl.
*H04L 1/18* (2006.01)
*H04L 1/20* (2006.01)
*H04L 1/00* (2006.01)

(52) U.S. Cl.
CPC ........ *H04L 1/20* (2013.01); *H04L 2001/0096* (2013.01)

(58) Field of Classification Search
CPC ......... H04L 1/189; H04L 1/20; H04L 1/1614; H04L 2001/0096; H04L 5/001; H04L 5/0098
See application file for complete search history.

(56) References Cited

U.S. PATENT DOCUMENTS

| | | |
|---|---|---|
| 2016/0080339 A1 | 3/2016 | Zhang et al. |
| 2016/0380779 A1 | 12/2016 | Sharma et al. |
| 2018/0332501 A1 | 11/2018 | Tseng et al. |
| 2018/0368132 A1 | 12/2018 | Babaei et al. |
| 2021/0112610 A1* | 4/2021 | Xiao .................. H04W 28/04 |
| 2021/0152296 A1* | 5/2021 | Chen .................. H04L 1/189 |

OTHER PUBLICATIONS

European Patent Office, "European Search Report,"Application No. EP18178042.0, dated Dec. 3, 2018, 12 pages.
Ericsson, "Duplication in UL in Dual connectivity," R2-1702750, 3GPP TSG-RAN WG2 #97bis, Spokane, USA, Apr. 3-7, 2017, 2 pages.
Nokia, et al., "Duplication Impacts to MAC," R2-1704272, 3GPP TSG-RAN WG2 Meeting #98, Hangzhou, China, May 15-19, 2017, 3 pages.
Samsung, "Lossless AM Operation for NR," R2-1705720 (Resubmission of R2-1703737), 3GPP TSG-RAN WG2 Meeting #98, Hangzhou, China, May 15-19, 2017, 2 pages.
Vivo, "Duplication data in CA," R2-1704578, 3GPP TSG-RAN WG2 Meeting #98, Hangzhou, China, May 15-19, 2017, 3 pages.
ZTE, "Consideration on the activation/deactivation of data duplication for CA," R2-1704660, 3GPP TSG-RAN WG2 Meeting #98, May 15-19, 2017, 3 pages.
The First Office Action dated Apr. 26, 2021, from the China National Intellectual Property Administration in connection with Chinese Patent application No. 201810612210.4, 23 pages.

* cited by examiner

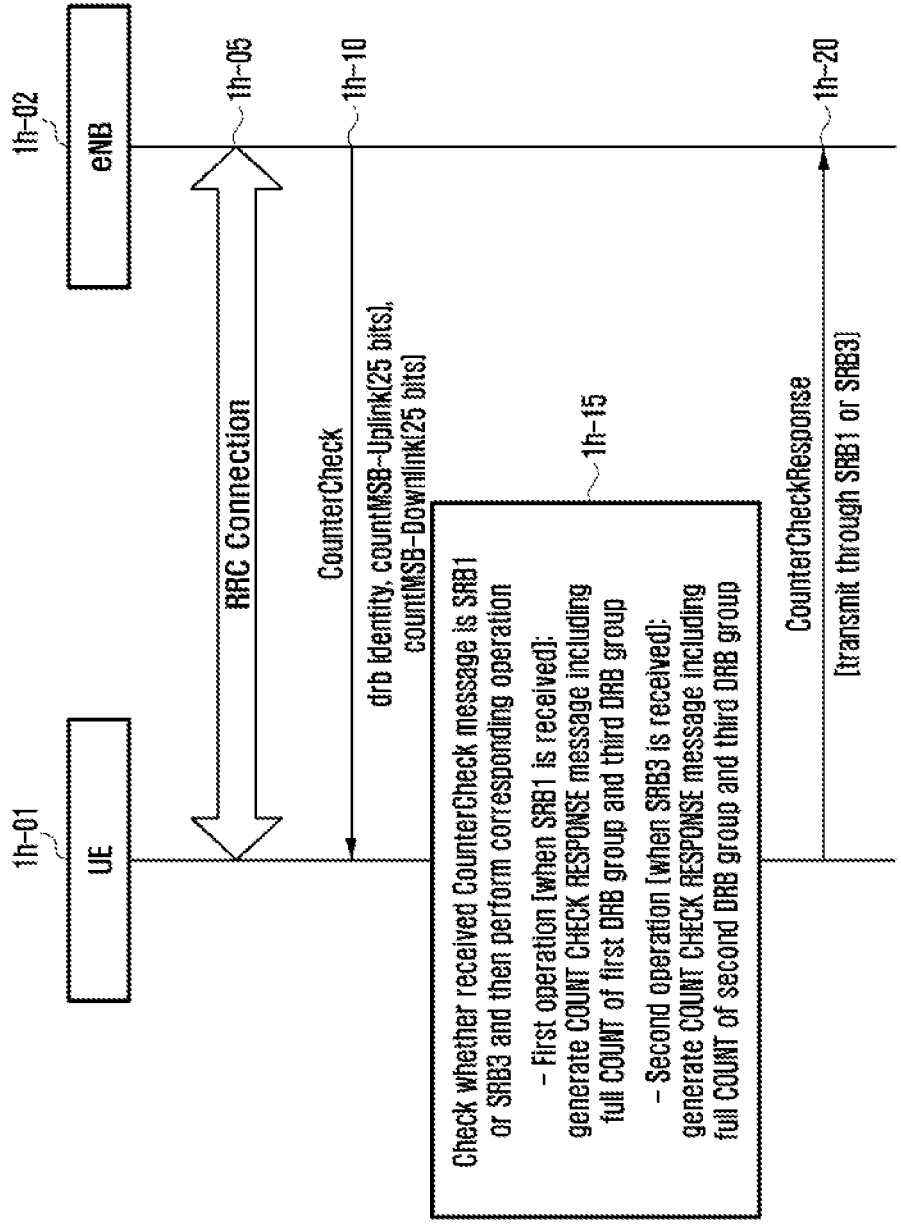

FIG. 2G

Case 2-1 (MAC CE per RB)

| R | R | LCID |
|---|---|---|
| F | L | |
| | Radio Bearer ID 1 | |
| | Radio Bearer ID 2 | |

Case 2-2 (MAC CE per RB)

| R | R | LCID |
|---|---|---|
| F | L | |
| B0 | B1 | B2 | B3 | B4 | B5 | B6 | B7 |

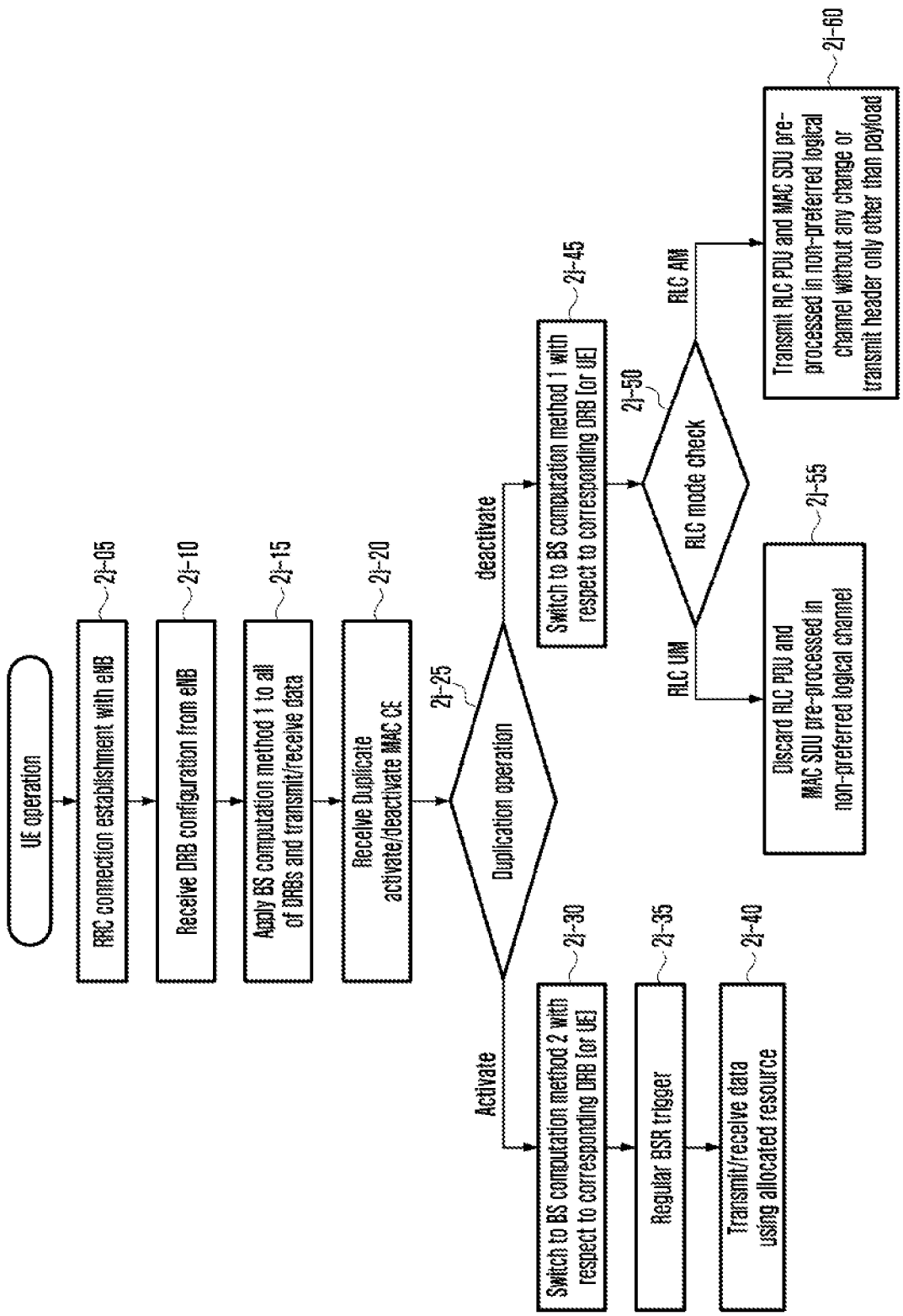

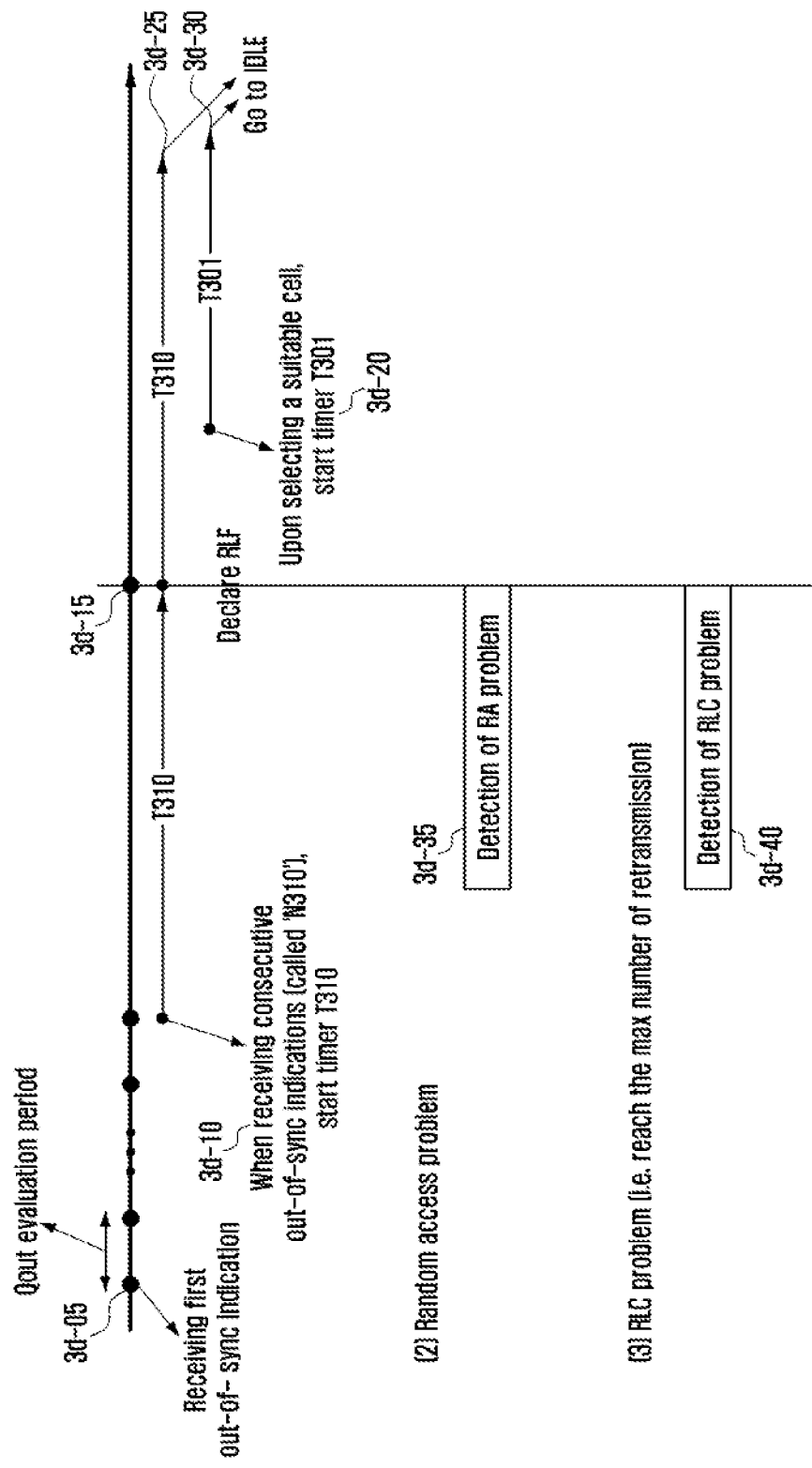

METHOD AND APPARATUS FOR PROCESSING PACKET IN NEXT-GENERATION MOBILE COMMUNICATION SYSTEM

CROSS-REFERENCE TO RELATED APPLICATIONS

This application is a continuation of U.S. patent application Ser. No. 16/280,598 filed on Feb. 20, 2019, now U.S. Pat. No. 10,736,162 issued on Aug. 4, 2020, which is a continuation of U.S. patent application Ser. No. 16/009,951 filed on Jun. 15, 2018, now U.S. Pat. No. 10,694,569 issued on Jun. 23, 2020, which is based on and claims priority under 35 U.S.C. § 119 to Korean Patent Application No. 10-2017-0076681 filed on Jun. 16, 2017, Korean Patent Application No. 10-2017-0087850 filed on Jul. 11, 2017, and Korean Patent Application No. 10-2017-0101911 filed on Aug. 10, 2017 in the Korean Intellectual Property Office, the disclosures of which are herein incorporated by reference in their entirety.

BACKGROUND

1. Field

The present disclosure relates to a terminal and base station operation in a next-generation mobile communication system.

The present disclosure relates to a method of performing a PDCP COUNT CHECK operation in a next-generation mobile communication system and an apparatus performing the same.

2. Description of Related Art

Furthermore, the present disclosure relates to an operation and apparatus for activating and deactivating packet duplication in a next-generation mobile communication system.

Furthermore, the present disclosure relates to a method and apparatus for processing a packet duplication transmission failure in a next-generation mobile communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

The present disclosure may provide a method for a base station to request a count check from a terminal and for the terminal to perform a corresponding operation in a next-generation mobile communication system. Specifically, the present disclosure may provide a method different from that of the existing LTE when PDCP reordering is taken into consideration. For example, in a next-generation mobile communication, LTE and new radio (NR) may operate in a dual connected manner. In such a case, different count check operations may be performed in a master cell group (MCG) and a secondary cell group (SCG), and the operations need to operate independently.

Furthermore, the present disclosure may provide contents related to packet-duplicated data transmission that is newly introduced in a next-generation mobile communication system, and it clearly defines an operation of a terminal when the terminal receives the activation or deactivation of packet duplication through a medium access control (MAC) control element (CE) from a base station. An embodiment of the present disclosure may provide a detailed operation in the MAC when the activation or deactivation of packet duplication is received.

Furthermore, the present disclosure may provide a method and apparatus for processing a packet duplication transmission failure in a next-generation mobile communication system.

An embodiment of the present disclosure provides a method of a terminal, including receiving packet duplication data radio bearer (DRB) configuration information from a base station, receiving a medium access control (MAC) control element (CE) including information indicating whether packet duplication has been activated from the base station, and determining whether to activate a packet duplication bearer based on the packet duplication DRB configuration information and the MAC CE.

Furthermore, an embodiment of the present disclosure provides a terminal, including a transceiver configured to transmit and receive signals and a controller configured to control to receive packet duplication data radio bearer (DRB) configuration information from a base station, receive a medium access control (MAC) control element (CE) including information indicating whether packet duplication has been activated from the base station, and determine whether to activate a packet duplication bearer based on the packet duplication DRB configuration information and the MAC CE.

Furthermore, an embodiment of the present disclosure provides a method of a base station, including transmitting packet duplication data radio bearer (DRB) configuration information to a terminal and transmitting a medium access control (MAC) control element (CE) including information indicating whether packet duplication has been activated to the terminal, wherein whether to activate a packet duplication bearer is determined based on the packet duplication DRB configuration information and the MAC CE.

Furthermore, an embodiment of the present disclosure provides a base station, including a transceiver configured to transmit and receive signals and a controller configured to transmit packet duplication data radio bearer (DRB) configuration information to a terminal and transmit a medium access control (MAC) control element (CE) including information indicating whether packet duplication has been activated to the terminal, wherein whether to activate a packet duplication bearer is determined based on the packet duplication DRB configuration information and the MAC CE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1H is a diagram illustrating the entire COUNT CHECK operation in a next-generation mobile communication system according to an embodiment of the present disclosure;

FIG. 2G is a diagram illustrating the structure of a packet duplication activation/deactivation MAC CE according to an embodiment of the present disclosure;

FIG. 2J is a diagram illustrating an operation for a UE to perform packet duplication according to an embodiment of the present disclosure;

FIG. 3D is a diagram for illustrating a radio link failure (RLF) operation in the LTE technology according to an embodiment of the present disclosure;

FIG. 3I is a diagram illustrating the configuration of an eNB according to an embodiment of the present disclosure.

DETAILED DESCRIPTION

FIGS. 1A through 3I, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, some embodiments of the present disclosure are described in detail with reference to the accompanying drawings. In describing the present disclosure, a detailed description of a related known function or configuration related to the present disclosure will be omitted if it is deemed to make the gist of the present disclosure unnecessarily vague. Furthermore, terms to be described hereunder have been defined by taking into consideration functions in the present disclosure, and may be different depending on a user, an operator's intention or practice. Accordingly, each term should be defined based on contents over the entire specification. In the following description, a term to identify an access node, a term to denote network entities, a term to denote messages, a term to denote an interface between network entities, and a term to denote a variety of types of identity information have been illustrated for convenience of description. Accordingly, the present disclosure is not limited to the following terms, and other terms to denote targets having equivalent technical meanings may be used.

Hereinafter, for convenience of description, in embodiments of the present disclosure, terms and names defined in the $3^{rd}$ generation partnership project long term evolution (3GPP LTE) standard or terms and names modified from the defined terms and names are used. However, the present disclosure is not limited to the terms and names and may be identically applied to systems based on other standards.

Figure 1A:
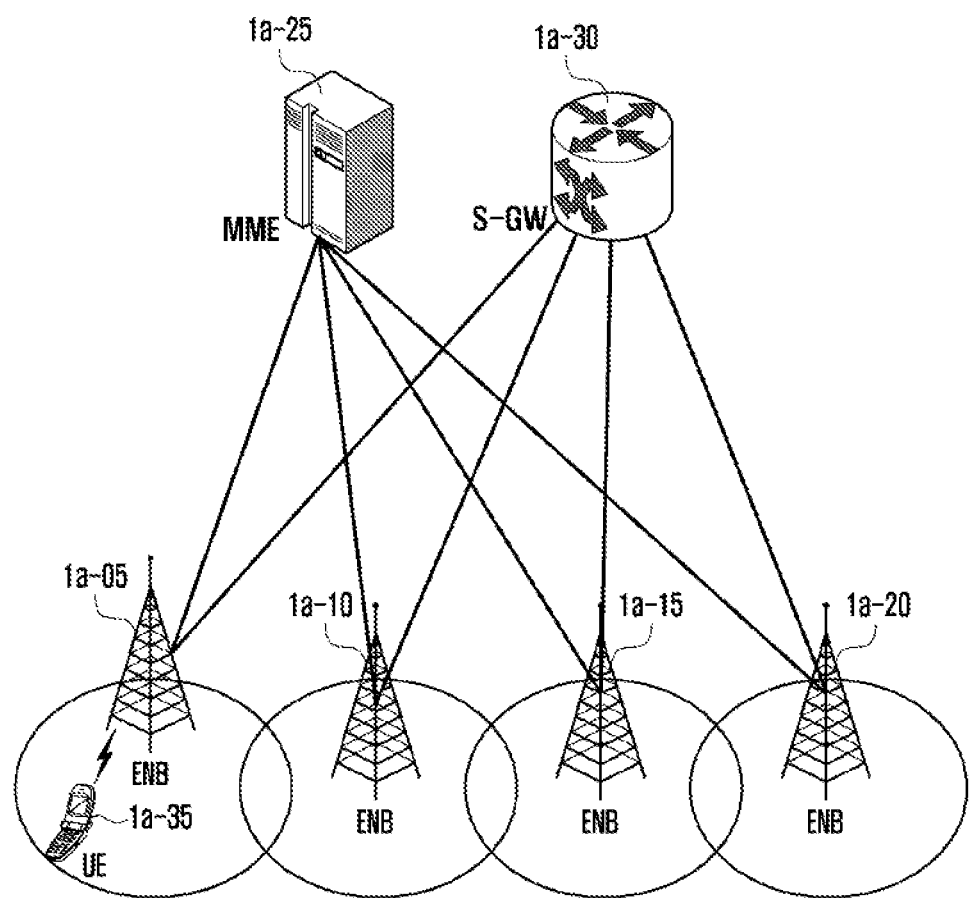
FIG. 1A is a diagram illustrating the configuration of an LTE system according to an embodiment of the present disclosure.

FIG. 1A is a diagram illustrating the configuration of an LTE system according to an embodiment of the present disclosure.

Referring to FIG. 1A, the radio access network of the LTE system includes next-generation evolved Node Bs (hereinafter referred to as "eNBs", "Node Bs" or "base stations") 1a-05, 1a-10, 1a-15, and 1a-20, a mobility management entity (MME) 1a-25, and a serving-gate (S-GW) 1a-30. A user equipment (hereinafter referred to as a "UE or terminal") 1a-35 accesses an external network through the eNBs 1a-05, 1a-10, 1a-15, and 1a-20 and the S-GW 1a-30.

In FIG. 1A, the eNBs 1a-05, 1a-10, 1a-15, and 1a-20 correspond to the Node Bs of the existing UMTS system. The eNB is connected to the UE 1a-35 through a radio channel and performs a more complex function than the existing Node B. In the LTE system, all of types of user traffic including a real-time service, such as voice over IP (VoIP), through the Internet protocol, are served through a shared channel. Accordingly, a device that performs schedules by collecting state information, such as the buffer state, available transmission power state, and channel state of UEs, may be necessary. The eNBs 1a-05, 1a-10, 1a-15, and 1a-20 are in charge of such a device. In general, one eNB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 1a-30 provides a data bearer and generates or removes a data bearer under the control of the MME 1a-25. The MME is in charge of various control functions in addition to a mobility management function for a UE, and is connected to multiple eNBs.

Figure 1B:
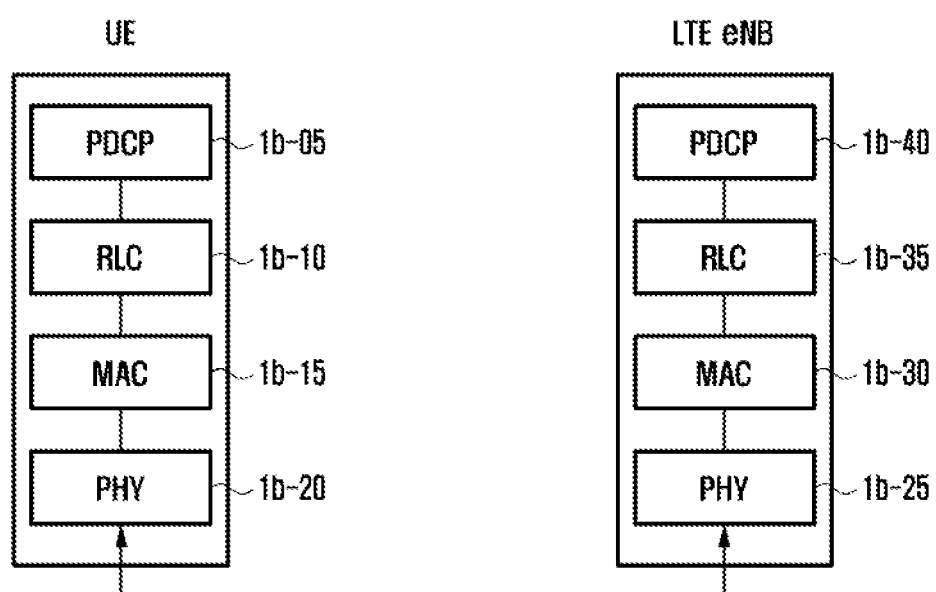
FIG. 1B is a diagram illustrating radio protocol architecture in the LTE system according to an embodiment of the present disclosure.

FIG. 1B is a diagram illustrating radio protocol architecture in the LTE system according to an embodiment of the present disclosure.

Referring to FIG. 1B, the radio protocol of the LTE system includes packet data convergence protocols (PDCPs) 1b-05 and 1b-40, radio link control (RLC) 1b-10 and 1b-35, and medium access control (MAC) 1b-15 and 1b-30 in a UE and an eNB, respectively. The PDCPs 1b-05 and 1b-40 are in charge of an operation, such as IP header compression/restoration. Major functions of the PDCP 1b-05, 1b-40 are summarized as follows.

Header compression and decompression: ROHC only
    Transfer of user data
    In-sequence delivery of upper layer PDUs in a PDCP re-establishment procedure for RLC AM
    Reordering function (for split bearers in DC (only support for RLC AM): PDCP PDU routing for transmission and PDCP—PDU reordering for reception)
    Duplicate detection of lower layer SDUs in a PDCP re-establishment procedure for RLC AM
    Retransmission of PDCP SDUs at handover and, for split bearers in DC, of PDCP PDUs in a PDCP data-recovery procedure, for RLC AM
    Ciphering and deciphering
    Timer-based SDU discard in uplink.

The RLC 1b-10, 1b-35 reconfigures a PDCP packet data unit (PDU) in a proper size and performs an ARQ operation. Major functions of the RLC are summarized as follows.

Transfer of upper layer PDUs
    ARQ function (Error Correction through ARQ (only for AM data transfer))
    Concatenation, segmentation and reassembly of RLC SDUs (only for UM and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MAC 1b-15, 1b-30 is connected to multiple RLC layer devices configured in one UE, and performs an operation of multiplexing RLC PDUs with a MAC PDU and demultiplexing RLC PDUs from a MAC PDU. Major functions of the MAC are summarized as follows.

Mapping between logical channels and transport channels
    Multiplexing/demultiplexing of MAC SDUs belonging to one or different logical channels into/from transport blocks (TB) delivered to/from the physical layer on transport channels)
    Scheduling information reporting
    Error correction through HARQ
    Priority handling between logical channels of one UE
    Priority handling between UEs by means of dynamic scheduling
    MBMS service identification
    Transport format selection
    Padding A physical layer 1b-20, 1b-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OPDM symbol to a higher layer.

Figure 1C:
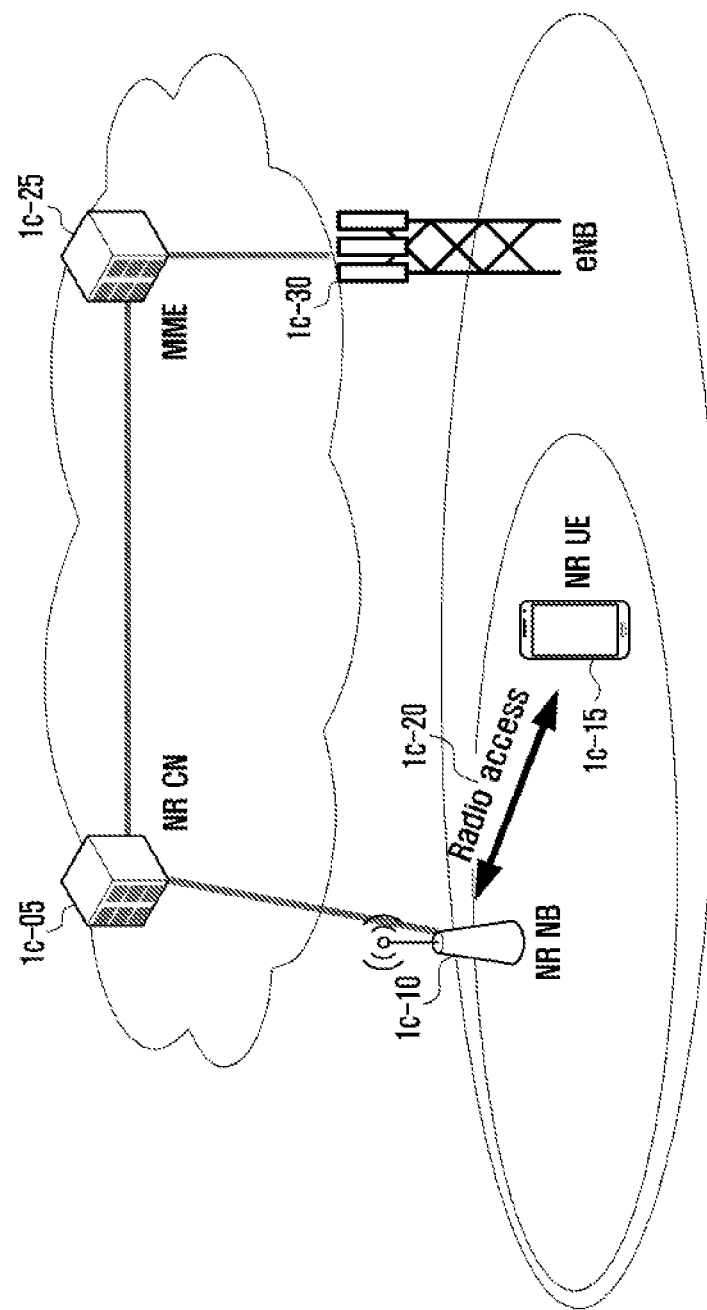
FIG. 1C is a diagram illustrating the configuration of a next-generation mobile communication system according to an embodiment of the present disclosure.

FIG. 1C is a diagram illustrating the configuration of a next-generation mobile communication system according to an embodiment of the present disclosure.

Referring to FIG. 1C, the radio access network of the next-generation mobile communication system includes a new radio Node B (hereinafter referred to as an "NR NB" or a "base station") 1c-10 and a new radio core network (NR CN) 1c-05. A new radio user equipment (hereinafter referred to as an "NR UE" or a "terminal") 1c-15 accesses an external network through the NR NB 1c-10 and the NR CN 1c-05.

In FIG. 1C, the NR NB 1c-10 corresponds to an evolved Node B (eNB) of the existing LTE system. The NR NB 1c-10 is connected to the NR UE 1c-15 through a radio channel, and may provide an excellent service compared to the existing Node B. The next-generation mobile communication system requires a device for performing scheduling by collecting state information, such as the buffer state, available transmission power state, and channel state of UEs, because all of types of user traffic are served through a shared channel. The NR NB 1c-10 is in charge of the device. In general, one NR NB controls multiple cells. In order to implement ultra-high speed data transfer compared to the existing LTE, the next-generation mobile communication system may have the existing maximum bandwidth or more and may additionally graft the beamforming technology using OFDM as a radio access technology. Furthermore, the next-generation mobile communication system adopts the AMC scheme that determines a modulation scheme and a channel coding rate based on the channel state of a UE. The NR CN 1c-05 performs functions, such as mobility support, a bearer configuration, and a QoS configuration. The NR CN 1c-05 is in charge of various control functions in addition to a mobility management function for a UE, and is connected to multiple eNBs. Furthermore, the next-generation mobile communication system may also operate in conjunction with the existing LTE system. The NR CN is connected to an MME 1c-25 through a network interface. The MME 1c-25 is connected to an eNB 1c-30, that is, the existing eNB.

Figure 1D:
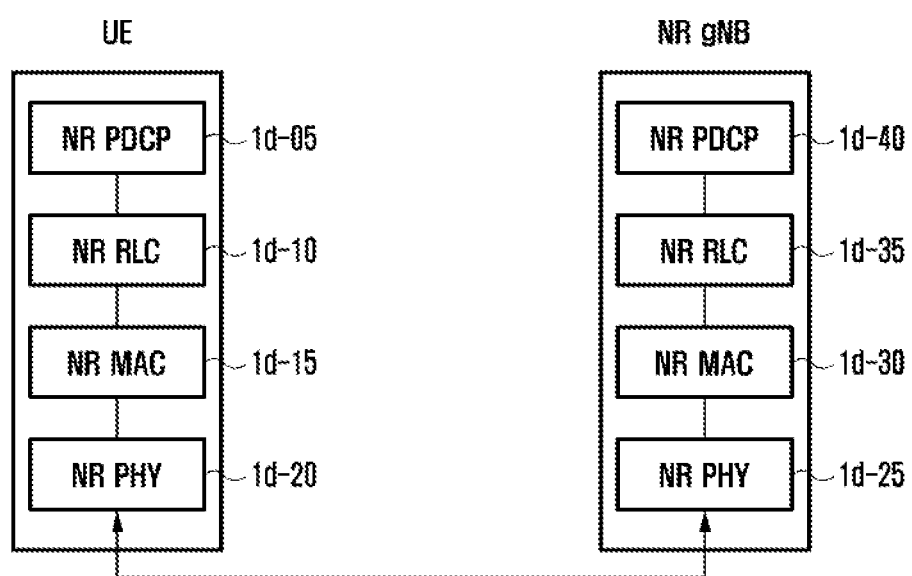
FIG. 1D is a diagram illustrating radio protocol architecture of a next-generation mobile communication system according to an embodiment of the present disclosure.

FIG. 1D is a diagram illustrating radio protocol architecture of a next-generation mobile communication system according to an embodiment of the present disclosure.

Referring to FIG. 1D, the radio protocol of the next-generation mobile communication system includes NR PDCPs 1d-05 and 1d-40, NR RLC 1d-10 and 1d-35, and NR MAC 1d-15 and 1d-30, respectively, in a UE and an NR NB. Major functions of the NR PDCP 1d-05, 1d-40 may include some of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink.

The reordering function of the NR PDCP device refers to a function of sequentially reordering PDCP PDUs received from a lower layer based on a PDCP sequence number (SN). The reordering function may include a function of transmitting data in a reordered sequence to a higher layer or a function of directly transmitting the data to a higher layer without taking the order into consideration, a function of reordering orders and recording lost PDCP PDUs, a function of making a status report on lost PDCP PDUs to the transmission side, and a function of requesting the retransmission of lost PDCP PDUs. Major functions of the NR RLC 1d-10, 1d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of the RLC SDUs
Re-segmentation of RLC data PDUs
Reordering of RLC data PDUs
Duplicate detection
Protocol error detection
RLC SDU discard
RLC re-establishment The in-sequence delivery function of the NR RLC device refers to a function of sequentially transmitting RLC SDUs received from a lower layer to a higher layer, and may include a function of reassembling and transmitting multiple RLC SDUs if one RLC SDU has been originally segmented into the multiple RLC SDUs and received. The in-sequence delivery function may include a function of reordering received RLC PDUs based on an RLC sequence number (SN) or a PDCP sequence number (SN), a function of reordering orders and recording lost RLC PDUs, a function of transmitting a status report on lost RLC PDUs to the transmission side, a function of requesting the retransmission of lost RLC PDUs, a function of sequentially transmitting only RLC SDUs prior to a lost RLC SDU to a higher layer when the lost RLC SDU occurs, a function of sequentially transmitting all of RLC SDUs received until a given timer expires to a higher layer when the timer expires although there is a lost RLC SDU, and a function of sequentially transmitting all of RLC SDUs received so far to a higher layer when a given timer expires although there is a lost RLC SDU. Furthermore, the in-sequence delivery function may include a function of processing RLC PDUs in order that the RLC PDUs are received (in order of arrival regardless of the order of a serial number and sequence number) and transmitting the RLC PDUs to a PDCP device regardless of their orders (i.e., out-of-sequence delivery). The in-sequence delivery function may include a function of receiving segments stored in a buffer or segments to be received subsequently, reconfiguring the segments in one complete RLC PDU, processing the RLC PDU, and transmitting the RLC PDU to the PDCP device. The NR RLC layer may not include a concatenation function. The concatenation function may be performed by the NR MAC layer or may be substituted with the multiplexing function of the NR MAC layer.

The out-of-sequence delivery function of the NR RLC device refers to a function of directly transmitting RLC SDUs received from a lower layer to a higher layer regardless of their orders. The out-of-sequence delivery function may include a function of reassembling multiple RLC SDUs if one RLC SDU has been originally segmented into the multiple RLC SDUs and received. The out-of-sequence delivery function may include a function of storing the RLC SNs or PDCP SNs of received RLC PDUs, reordering their orders, and recording lost RLC PDUs.

The NR MAC 1d-15, 1d-30 may be connected to multiple NR RLC layer devices configured in one UE. Major functions of the NR MAC may include some of the following functions.

Mapping between logical channels and transport channels
Multiplexing/demultiplexing of the MAC SDUs
Scheduling information reporting
Error correction through HARQ
Priority handling between logical channels of one UE
Priority handling between the UEs by means of dynamic scheduling
MBMS service identification
Transport format selection
Padding The NR PHY layer 1d-20, 1d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Figure 1E:
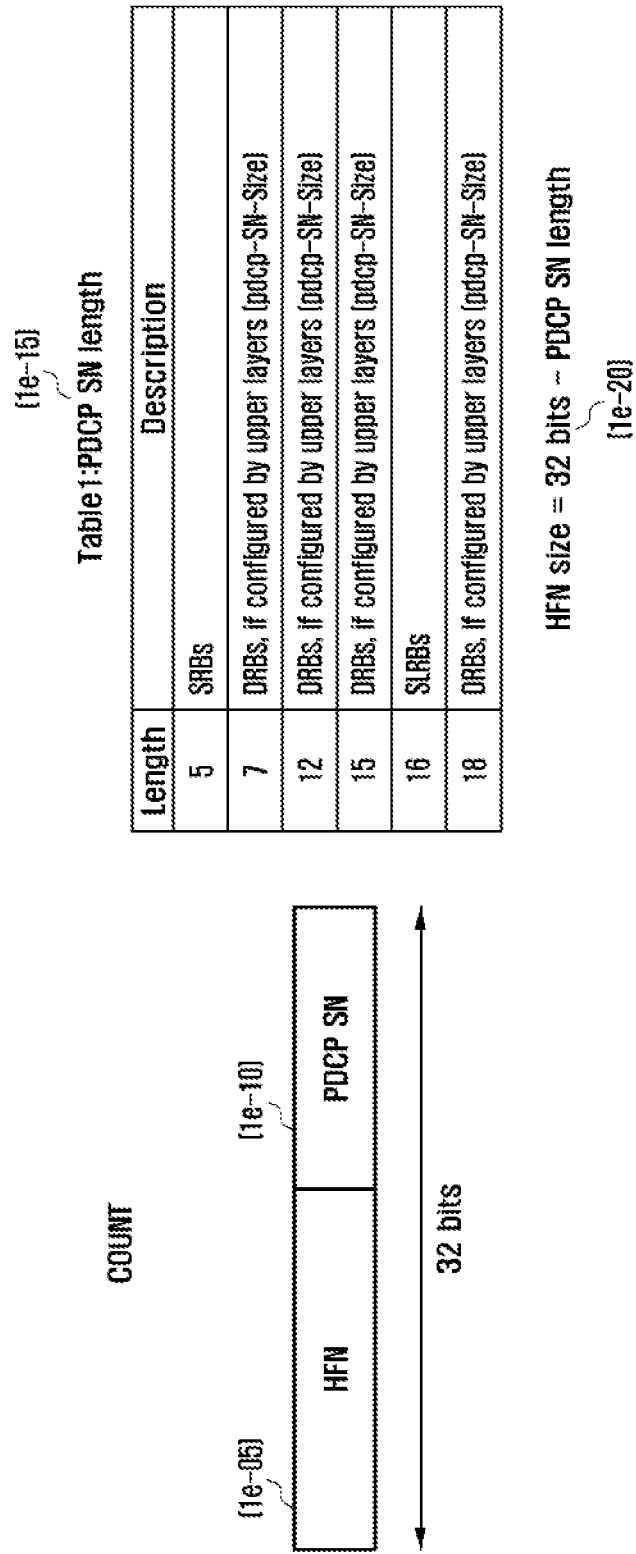
FIG. 1E is a diagram illustrating the structure of a COUNT value in LTE according to an embodiment of the present disclosure.

FIG. 1E is a diagram illustrating the structure of a COUNT value in LTE according to an embodiment of the present disclosure.

In the PDCP, a value called "COUNT" is stored for ciphering and integrity protection between a UE and an eNB. Upon performing the ciphering and integrity protection of a PDCP packet, the stored COUNT value is used as the parameter of a previously configured ciphering and integrity protection algorithm. A detailed description is given with reference to FIG. 1F.

All of PDCP packets (e.g., data packets and control message packets) have PDCP sequence numbers (SN), and each one may have a value by 1 increased from a previous value when a packet is generated. When a preset PDCP SN size is exceeded, the PDCP SN is counted again from 0. In this case, the PDCP SN may have the same SN of a previously transmitted PDCP packet. If a hacker has a previous SN value and attempts hacking using the corresponding value when communication between a UE and an eNB is performed, the communication may be influenced due to an added PDCP packet. A UE and an eNB have introduced a COUNT value in order to solve a security problem that may occur because the SN length is restricted. The COUNT value has a 32-bit length and includes a hyper frame number (HFN) 1e-05 and a PDCP SN 1e-10. The UE and the eNB may maintain the COUNT value and use it for ciphering and integrity protection. Upon actual data transmission, a PDCP packet includes only the SN. Accordingly, it is difficult for a hacker to be aware of an accurate COUNT value because only the PDCP SN is transmitted through a radio channel. For reference, the PDCP SN used in LTE has multiple values as in Table 1-1 1e-15.

TABLE 1-1

PDCP SN length

| Length | Description |
| --- | --- |
| 5 | SRBs |
| 7 | DRBs, if configured by upper layers (pdcp-SN-Size) |
| 12 | DRBs, if configured by upper layers (pdcp-SN-Size) |
| 15 | DRBs, if configured by upper layers (pdcp-SN-Size) |
| 16 | SLRBs |
| 18 | DRBs, if configured by upper layers (pdcp-SN-Size) |

When an eNB configures a PDCP configuration for a UE through an RRC message, PDCP SN sizes of 5, 7, 12, 15, 16 and 18 bits are set, and a COUNT value may be automatically generated based on the set values. That is, the size of the HFN is implicitly determined (1e-20).

Figure 1F:
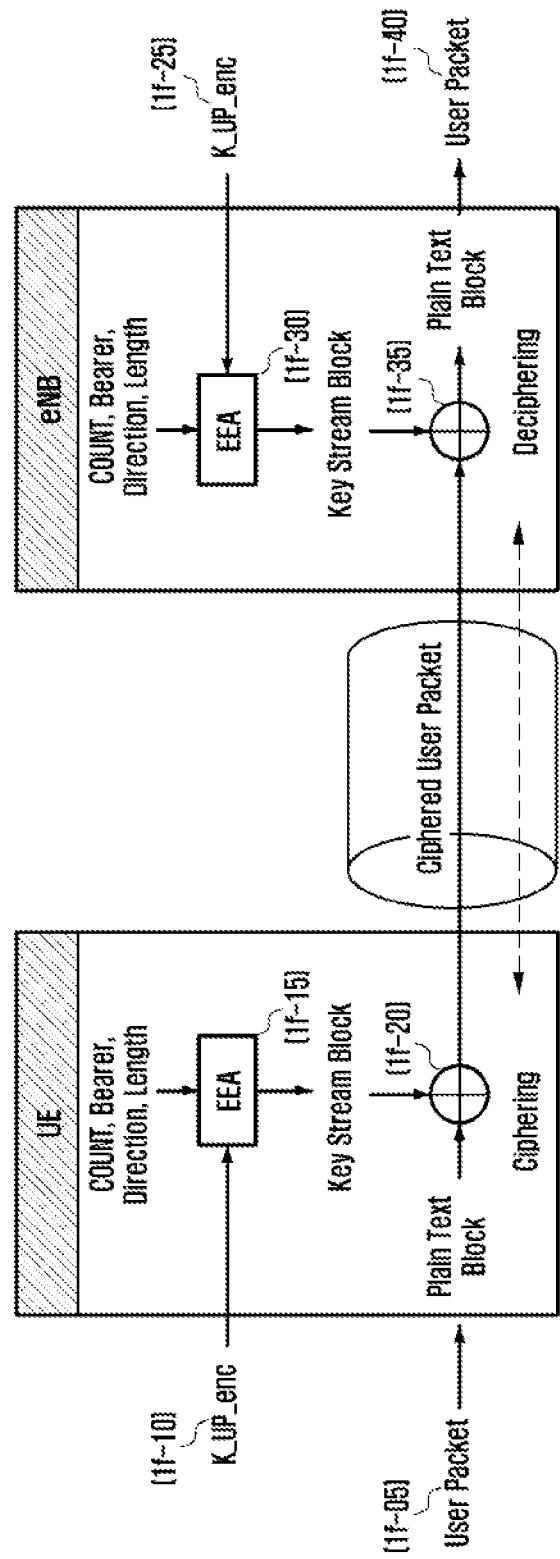
FIG. 1F is a diagram illustrating a ciphering process in the AS security of an LTE system in order to describe an example in which a COUNT value of the present disclosure is used.

FIG. 1F is a diagram illustrating a ciphering process in the access stratum (AS) security of an LTE system in order to describe an example in which a COUNT value of the present disclosure is used.

FIG. 1F shows a series of processes of performing ciphering on the uplink data of a user generated in a UE, transferring the data to an eNB, and deciphering the data. In this case, the same is true of a downlink ciphering/deciphering operation, and thus is not shown in FIG. 1F. In LTE, all of packets are transmitted in the state in which they have not been ciphered until the AS security is activated, and all of types of traffic (control plane (CP) and user plane (UP) data) are ciphered and transmitted after the AS security is activated. That is, when a UE and an eNB exchange a SecurityModeCommand message and a SecurityModeComplete message and a security configuration is completed, all of RRC messages exchanged between the UE and the eNB are subject to integrity protection and ciphering and transmitted, and an IP packet is ciphered and transmitted.

After the AS security is setup, when the uplink data of the UE occurs (1f-05), a key stream block obtained through a key generation algorithm (EPS encryption algorithm) 1f-15 for the ciphering of the UE and a pure uplink data block (i.e., plain text block) are subject to exclusive OR operation 1f-20 to generate a ciphered user packet. In this case, the key stream block for ciphering may be obtained by performing the key generation algorithm using a key (K_UP_enc) 1f-10 for the ciphering of a user plane obtained from K_eNB and parameters, such as COUNT (32-bit upward NAS COUNT value), Bearer (bearer ID), Direction (message transmission direction, 0: uplink, 1: downlink), and Length (the length of the key stream block), as input. The eNB receives the user data packet ciphered by the UE, generates the same key stream block as that used in the ciphering by performing the key generation algorithm applied in the UE, and performs exclusive OR operation (1f-35). As in the execution of the algorithm in the UE, the eNB may obtain the key stream block for ciphering using a key (K_UP_enc) 1f-25 for the ciphering of a user plane obtained from K_eNB and parameters, such as COUNT (32-bit upward NAS COUNT value), Bearer (bearer ID), Direction (message transmission direction, 0: uplink, 1: downlink), and Length (the length of the key stream block), as input (1f-30). The reception stage may perform selective deciphering by reversely applying the ciphering operation in the transmission stage.

In order to accurately perform the ciphering process, the COUNT values owned by the UE and the eNB must be accurate. That is, in order to apply an accurate ciphering key to a PDCP packet on which ciphering will be performed, a process of checking whether the COUNT value is accurate may be necessary. To this end, LTE includes an operation for an eNB to request a UE to perform a COUNT CHECK. In response to the request from the eNB, the UE determines the suitability of a COUNT value and transmits the COUNT value to the eNB if it is determined that the COUNT value is not suitable. A detailed description is given with reference to FIG. 1G.

Figure 1G:
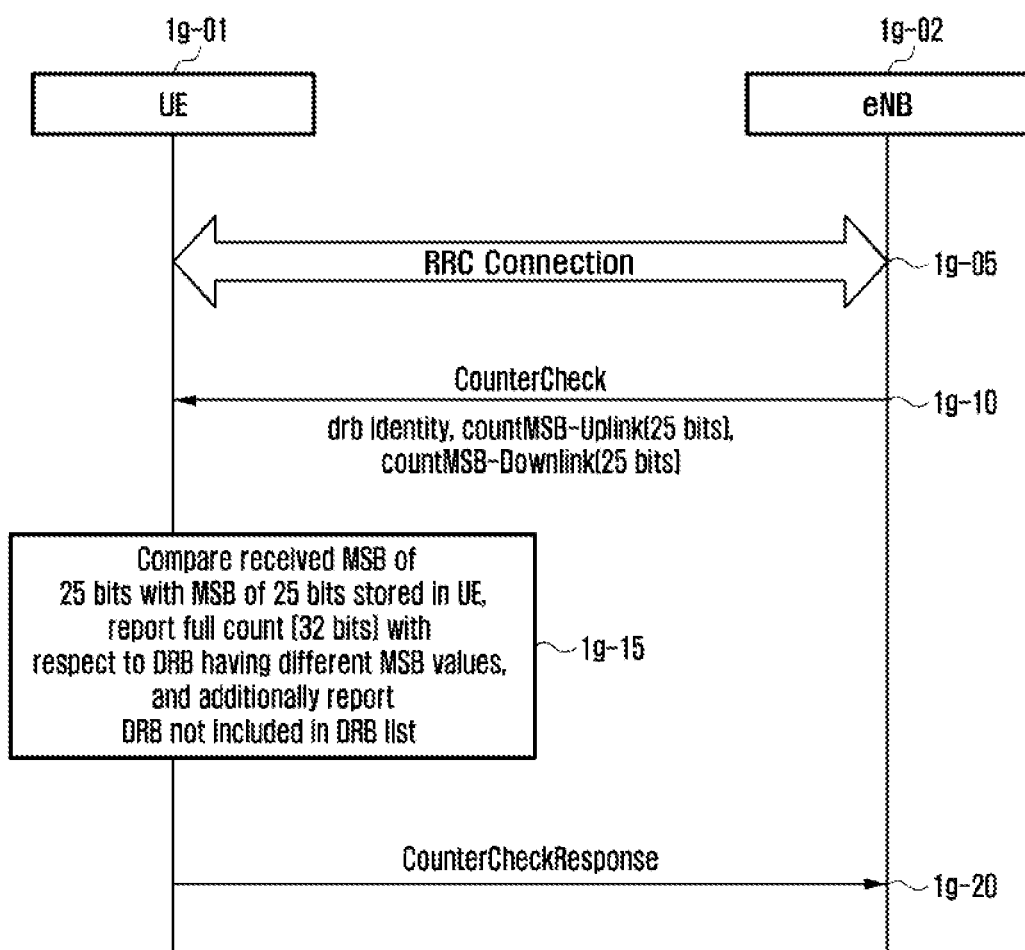
FIG. 1G is a diagram illustrating a COUNT CHECK operation in LTE according to an embodiment of the present disclosure.

FIG. 1G is a diagram illustrating a COUNT CHECK operation in LTE according to an embodiment of the present disclosure.

FIG. 1G shows the entire operation for an eNB to check a COUNT value of a UE. The eNB may identify whether a COUNT value for each configured DRB is valid through the corresponding operation.

First, when a UE 1g-01 and an eNB 1g-02 are RRC-connected (1g-05), the eNB requests a COUNT check and report for each DRB from the UE by transmitting a CounterCheck RRC message to the UE (1g-10). The message is transmitted through a dedicated common control channel (DCCH), and may be transmitted as a RRCConnectionReconfiguration or RRCConnectionReestablishment message. Furthermore, the CounterCheck message transmits list drb-CountMSB-InfoList for requesting a COUNT check for each DRB. The list includes a drb identity, countMSB-Uplink (25 bits), and countMSB-Downlink (25 bits). That is, the list includes the identifier of a DRB on which a COUNT check needs to be performed and the MSB 25 bits of an uplink and downlink COUNT value owned by the eNB in a corresponding DRB.

After receiving the message, the UE compares the MSB of 25 bits stored in the UE with the MSB of 25 bits of a configured DRB (i.e., performs both countMSB-Uplink and countMSB-Downlink, that is, values for the uplink and downlink). The UE generates a message in order to report a full COUNT (32 bits) for DRBs having different MSB values (1g-15). Furthermore, the UE generates a message in order to report a full COUNT for a DRB not included in the DRB list of the received CounterCheck message to the eNB (1g-15). If a COUNT value received from the eNB and a COUNT value calculated by the UE are the same, a corresponding DRB is excluded from a report list. Thereafter, the UE transmits a CounterCheckResponse message generated at operation 1g-15 to the eNB (1g-20).

FIG. 1H is a diagram illustrating the entire COUNT CHECK operation in a next-generation mobile communication system according to an embodiment of the present disclosure.

When a UE 1h-01 and an eNB 1h-02 are RRC-connected (1h-05), the eNB requests a COUNT check and report for each DRB from the UE by transmitting a CounterCheck RRC message to the UE (1h-10). The message is transmitted through a dedicated common control channel (DCCH), and may be transmitted as an RRCConnectionReconfiguration or RRCConnectionReestablishment message. Furthermore, the CounterCheck message transmits list drb-CountMSB-InfoList for requesting a COUNT check for each DRB. The list includes a drb identity, countMSB-Uplink (25 bits), and countMSB-Downlink (25 bits). That is, the list includes the identifier of a DRB on which a COUNT check needs to performed and the MSB 25 bits of an uplink and downlink COUNT value owned by the eNB in a corresponding DRB. However, the eNB may transmit the CounterCheck message through an SRB1 or SRB3. That is, if the UE is connected to an MCG, the UE may receive the COUNT CHECK request through an MCG SRB. If the UE is connected to an SCG, it may receive the COUNT CHECK request through an SCG SRB. Furthermore, the UE may receive a simultaneous COUNT CHECK request to the SRB1 and the SRB3.

After receiving the message, the UE checks whether a bearer on which the CounterCheck message has been received is the SRB1 or the SRB3 and then performs the following operation (1h-15).

1. When the SRB1 is received (first operation): generate a COUNT CHECK RESPONSE message including the full COUNT of a first DRB group and a third DRB group;

2. When the SRB3 is received (second operation): generate a COUNT CHECK RESPONSE message including the full COUNT of a second DRB group and a third DRB group;

In this case, the definition of the DRB groups used in the first operation and the second operation is as follows.

First DRB group: a set of DRBs that belong to an MCG bearer and an MCG split bearer, but are not included in drb-CountMSB-InfoList;

Second DRB group: a set of DRBs that belong to an SCG bearer and an SCG split bearer, but are not included in drb-CountMSB-InfoList;

Third DRB group: a set of DRBs that belongs to DRBs included in drb-CountMSB-InfoList and that do not have the same 25 MSB bits;

For example, when the CounterCheck message is received through the SRB 1, the UE receives a full COUNT value of DRBs that belong to an MCG bearer and an MCG split bearer, but are not included in drb-CountMSB-InfoList, compares the MSB of 25 bits of a DRB configured in the received CounterCheck message with the MSB of 25 bits stored in the UE (i.e., perform both countMSB-Uplink and countMSB-Downlink, that is, values for the uplink and downlink), and stores a full COUNT value of DRBs having different MSB values. If a COUNT value received from the eNB and a COUNT value calculated by the UE are the same, the UE excludes a corresponding DRB from a report list.

In this case, when the COUNT values are compared, it may be necessary for the UE to clarify that the values (countMSB-Uplink (25 bits) and countMSB-Downlink (25 bits)) set in the CounterCheck message will be compared with the COUNT value of which PDCP SDU. The UE may apply the following two methods.

Compare with the highest COUNT (NEXT_RX_COUNT-1) of one of PDCP SDUs received so far;

Or compare with the highest COUNT of PDCP SDUs on which REORDERING has been completed;

Furthermore, the UE needs to define that COUNT of which PDCP SDU will be reported. The UE may apply the following three methods.

The same COUNT report as a compared COUNT;

Or the highest COUNT at a reporting occasion;

Or the highest COUNT of PDCP SDUs on which REORDERING has been completed at a reporting occasion;

When the UE generates result information about CounterCheck in the above operation, it transmits an RRC message (CounterCheckResponse), including the corresponding information, to the eNB (1h-20).

Figure 1I:
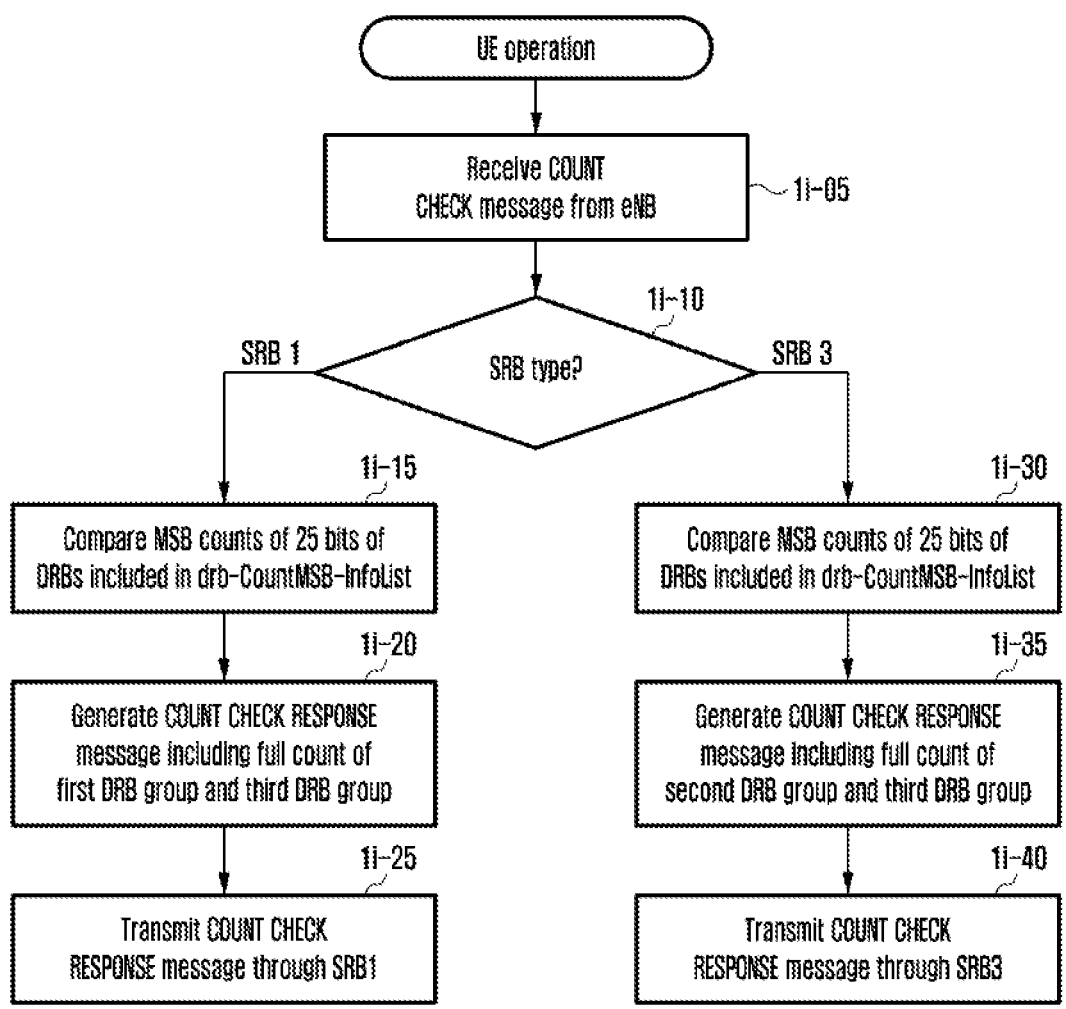
FIG. 1I is a diagram illustrating a UE operation according to an embodiment of the present disclosure.

FIG. 1I is a diagram illustrating a UE operation according to an embodiment of the present disclosure.

When the UE receives a COUNT CHECK request (RRC message) from an eNB (1i-05), the UE identifies that the RRC message has been transmitted through which SRB. If the UE receives the RRC message through the SRB1 (SRB of an MCG), the UE performs the first operation. If the UE receives the RRC message through the SRB3 (SRB of an SCG), the UE performs the second operation.

The first operation of the UE is a method of performing a COUNT CHECK on the first DRB group and the third DRB group when performing the COUNT CHECK. The first DRB group means a set of DRBs that belong to an MCG bearer and an MCG split bearer, but are not included in received drb-CountMSB-InfoList. The third DRB group means a set of DRBs that belongs to DRBs included in received drb-CountMSB-InfoList. That is, the UE performs a COUNT CHECK operation on a DRB list included in the third DRB group (i.e., compares the MSB of 25 bits of a DRB configured in the CounterCheck message with the MSB of 25 bits stored in the UE) (i.e., perform both countMSB-Uplink and countMSB-Downlink, that is, values for the uplink and downlink) and stores a full COUNT value of the UE with respect to a DRB having a different MSB value) (1i-15). The UE stores the full COUNT of the first DRB group and generates a COUNT CHECK RESPONSE message (1i-20). Thereafter, the UE transmits a generated COUNT CHECK RESPONSE message to the eNB (1i-25).

The second operation of the UE is a method of performing a COUNT CHECK on the second DRB group and the third DRB group when performing the COUNT CHECK. The second DRB group means a set of DRBs that belong to an SCG bearer and an SCG split bearer, but are not included in received drb-CountMSB-InfoList. The third DRB group means a set of DRBs included in received drb-CountMSB-InfoList. That is, the UE performs a COUNT CHECK operation on a DRB list included in the third DRB group (i.e., compares the MSB of 25 bits of a DRB configured in the CounterCheck message with the MSB of 25 bits stored in the UE) (i.e., perform both countMSB-Uplink and countMSB-Downlink, that is, values for the uplink and downlink) and stores a full COUNT value of the UE with respect to a DRB having a different MSB value) (1i-30). The UE stores the full COUNT of the second DRB group and generates a COUNT CHECK RESPONSE message (1i-35)). If a COUNT value received from the eNB and a COUNT value calculated by the UE are the same, the UE excludes a corresponding DRB from a report list. Thereafter, the UE transmits a generated COUNT CHECK RESPONSE message to the eNB (1i-40).

As described with reference to FIG. 1H, when the COUNT values are compared, it may be necessary for the UE to clarify that the values (countMSB-Uplink (25 bits) and countMSB-Downlink (25 bits)) set in the CounterCheck message will be compared with the COUNT value of which PDCP SDU. The UE may apply the following two methods.

Compare with the highest COUNT (NEXT_RX_COUNT-1) of PDCP SDUs received so far;

Or compare with the highest COUNT of PDCP SDUs on which REORDERING has been completed;

Furthermore, it may be necessary for the UE to define that the COUNT of which PDCP SDU will be reported. The UE may apply the following three methods.

The same COUNT report as that of a compared COUNT and;

Or the highest COUNT at a reporting occasion;

Or the highest COUNT of PDCP SDUs on which REORDERING has been completed at a reporting occasion.

Figure 1J:
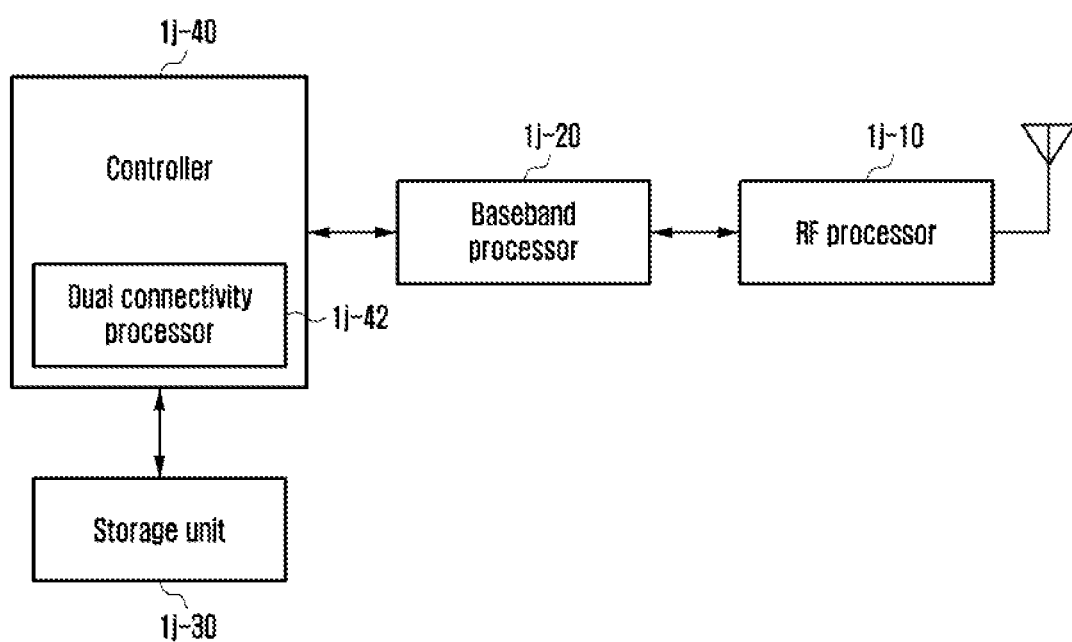
FIG. 1J is a diagram illustrating the configuration of a UE according to an embodiment of the present disclosure.

FIG. 1J is a diagram illustrating the configuration of a UE according to an embodiment of the present disclosure.

Referring to FIG. 1I, the UE includes a radio frequency (RF) processor 1j-10, a baseband processor 1j-20, a storage unit 1j-30, and a controller 1j-40.

The RF processor 1j-10 performs functions for transmitting/receiving a signal through a radio channel, such as the band conversion and amplification of a signal. That is, the RF processor 1j-10 up-converts a baseband signal received from the baseband processor 1j-20 into an RF band signal, transmits the RF band signal through an antenna, and down-converts an RF band signal received through the antenna into a baseband signal. For example, the RF processor 1j-10 may include a transmission filter, a reception filter, an amplifier, a mixer, an oscillator, a digital to analog convertor (DAC), and an analog to digital convertor (ADC). In FIG. 1J, only one antenna has been illustrated, but the UE may include multiple antennas. Furthermore, the RF processor 1j-10 may include multiple RF chains. Furthermore, the RF processor 1j-10 may perform beamforming. For the beamforming, the RF processor 1j-10 may adjust the phase and size of each of signals transmitted/received through multiple antennas or antenna elements. Furthermore, the RF processor may perform MIMO. When performing the MIMO operation, the RF processor may receive multiple layers.

The baseband processor 1*j*-20 performs a baseband signal and inter-bit stream conversion function based on the physical layer standard of a system. For example, when data is transmitted, the baseband processor 1*j*-20 generates complex symbols by coding and modulating a transmission bit stream. Furthermore, when data is received, the baseband processor 1*j*-20 reconstructs a received bit stream from a baseband signal received from the RF processor 1*j*-10 through modulation and demodulation. For example, if the OFDM scheme is applied, when data is transmitted, the baseband processor 1*j*-20 generates complex symbols by coding and modulating a transmission bit stream, maps the complex symbols to subcarriers, and then configures OFDM symbols through IFFT operation and CP insertion. Furthermore, when data is received, the baseband processor 1*j*-20 segments a baseband signal received from the RF processor 1*j*-10 in an OFDM symbol unit, reconstructs signals mapped to subcarriers through FFT operation, and reconstructs a received bit stream through modulation and demodulation.

The baseband processor 1*j*-20 and the RF processor 1*j*-10 transmit and receive signals as described above. Accordingly, the baseband processor 1*j*-20 and the RF processor 1*j*-10 may be called a transmitter, a receiver, a transceiver or a communication unit. Furthermore, at least one of the baseband processor 1*j*-20 and the RF processor 1*j*-10 may include multiple communication modules in order to support different multiple radio access technologies. Furthermore, at least one of the baseband processor 1*j*-20 and the RF processor 1*j*-10 may include different communication modules in order to process signals of different frequency bands. For example, the different radio access technologies may include a wireless LAN (e.g., IEEE 802.11) and a cellular network (e.g., LTE). Furthermore, the different frequency bands may include a super high frequency (SHF) (e.g., 2.NRHz, NRhz) band and a millimeter wave (e.g., 60 GHz) band.

The storage unit 1*j*-30 stores a basic program for the operation of the UE, an application program, and data such as configuration information. Specifically, the storage unit 1*j*-30 may store information related to a second access node that performs wireless communication using a second radio access technology. Furthermore, the storage unit 1*j*-30 provides stored data in response to a request from the controller 1*j*-40. Specifically, in relation to the present disclosure, the storage unit 1*j*-30 stores and updates a COUNT value.

The controller 1*j*-40 controls overall operations of the UE. For example, the controller 1*j*-40 transmits/receives a signal through the baseband processor 1*j*-20 and the RF processor 1*j*-10. Furthermore, the controller 1*j*-40 writes/reads data in/from the storage unit 1*j*-30. Specifically, in relation to the present disclosure, the controller 1*j*-40 writes/reads a COUNT value in/from the storage unit 1*j*-30. To this end, the controller 1*j*-40 may include at least one processor. For example, the controller 1*j*-40 may include a communication processor (CP) performing control for communication and an application processor (AP) controlling a higher layer, such as an application program.

Figure 1K:
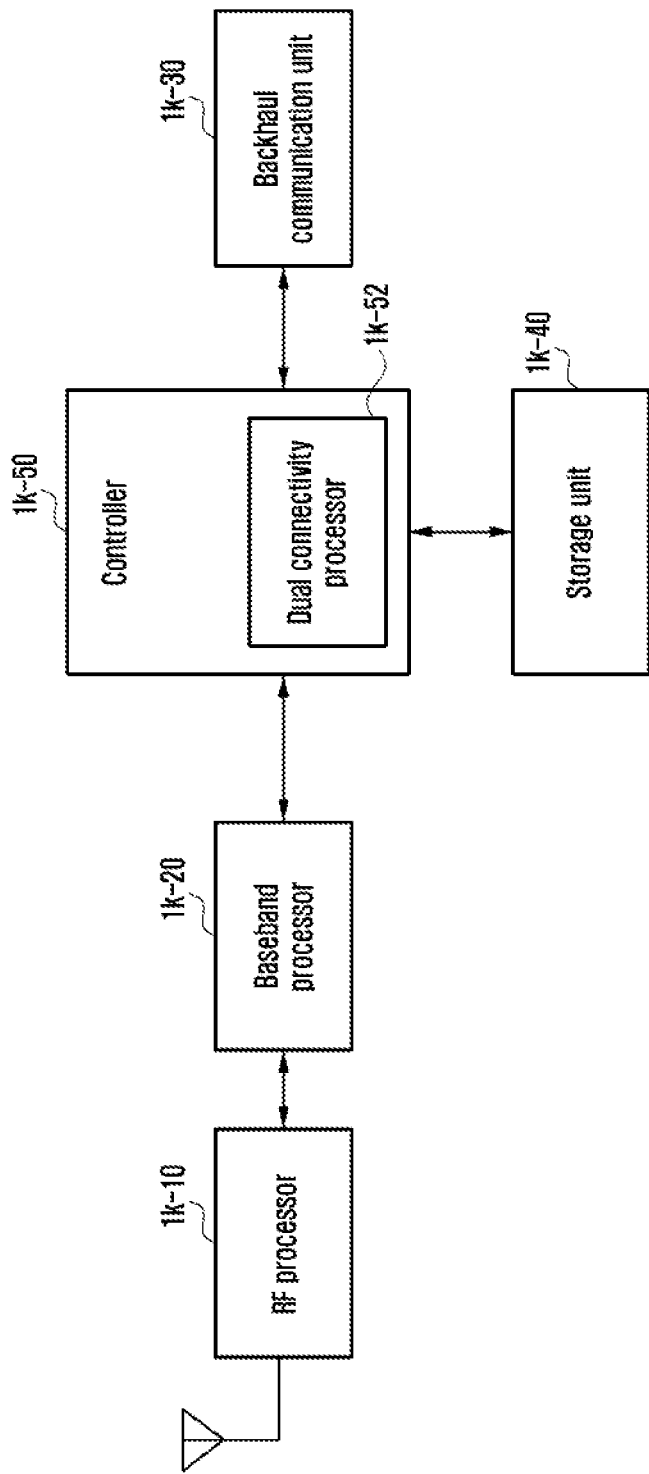
FIG. 1K is a diagram illustrating the configuration of an eNB according to an embodiment of the present disclosure.

FIG. 1K is a diagram illustrating the configuration of an eNB according to an embodiment of the present disclosure.

As shown in FIG. 1K, the eNB includes an RF processor 1*k*-10, a baseband processor 1*k*-20, a backhaul communication unit 1*k*-30, a storage unit 1*k*-40, and a controller 1*k*-50.

The RF processor 1*k*-10 performs a function for transmitting/receiving a signal through a radio channel, such as the band conversion and amplification of a signal. That is, the RF processor 1*k*-10 up-converts a baseband signal received from the baseband processor 1*k*-20 into an RF band signal, transmits the RF band signal through an antenna, and down-converts an RF band signal received through the antenna into a baseband signal. For example, the RF processor 1*k*-10 may include a transmission filter, a reception filter, an amplifier, a mixer, an oscillator, a DAC, and an ADC. In FIG. 1K, only one antenna has been illustrated, but the eNB may include multiple antennas. Furthermore, the RF processor 1*k*-10 may include multiple RF chains. Furthermore, the RF processor 1*k*-10 may perform beamforming. For the beamforming, the RF processor 1*k*-10 may adjust the phase and size of each of signals transmitted/received multiple antennas or antenna elements. The RF processor may perform a downlink MIMO operation by transmitting one or more layers.

The baseband processor 1*k*-20 performs a baseband signal and inter-bit stream conversion function based on the physical layer standard of a first radio access technology. For example, when data is transmitted, the baseband processor 1*k*-20 generates complex symbols by coding and modulating a transmission bit stream. Furthermore, when data is received, the baseband processor 1*k*-20 reconstructs a received bit stream from a baseband signal received from the RF processor 1*k*-10 through modulation and demodulation. For example, if the OFDM scheme is applied, when data is transmitted, the baseband processor 1*k*-20 generates complex symbols by coding and modulating a transmission bit stream, maps the complex symbols to subcarriers, and configures OFDM symbols through IFFT operation and CP insertion. Furthermore, when data is received, the baseband processor 1*k*-20 segments a baseband signal received from the RF processor 1*k*-10 in an OFDM symbol unit, reconstructs signals mapped to subcarriers through FFT operation, and then reconstructs a received bit stream through modulation and demodulation. The baseband processor 1*k*-20 and the RF processor 1*k*-10 transmit and receive signals as described above. Accordingly, the baseband processor 1*k*-20 and the RF processor 1*k*-10 may be called a transmitter, a receiver, a transceiver, a communication unit or a wireless communication unit.

The backhaul communication unit 1*k*-30 provides an interface for performing communication with other nodes within a network. That is, the backhaul communication unit 1*k*-30 converts a bit stream, transmitted from the primary eNB to a different node, for example, a secondary eNB or a core network, into a physical signal, and converts a physical signal received from the different node into a bit stream.

The storage unit 1*k*-40 stores data, such as a basic program for the operation of the primary eNB, an application program, and configuration information. Specifically, the storage unit 1*k*-40 may store information on a bearer allocated to an accessed UE and measurement results reported by an accessed UE. Furthermore, the storage unit 1*k*-40 may store information, that is, a criterion by which whether to provide a UE with dual connectivity or to stop dual connectivity is determined. Furthermore, the storage unit 1*k*-40 provides stored data in response to a request from the controller 1*k*-50.

The controller 1*k*-50 controls overall operations of the primary eNB. For example, the controller 1*k*-50 transmits/receives a signal through the baseband processor 1*k*-20 and the RF processor 1*k*-10 or through the backhaul communication unit 1*k*-30. Furthermore, the controller 1*k*-50 writes data in the storage unit 1*k*-40 and reads data from the storage unit 1*k*-40. Specifically, in relation to the present disclosure, the controller 1*k*-50 writes/reads a COUNT value in/from the storage unit 1*k*-40. To this end, the controller 1*k*-50 may include at least one processor.

Another embodiment of the present disclosure relates to an activation and deactivation operation method and apparatus for packet duplication in a next-generation mobile communication system.

Figure 2A:
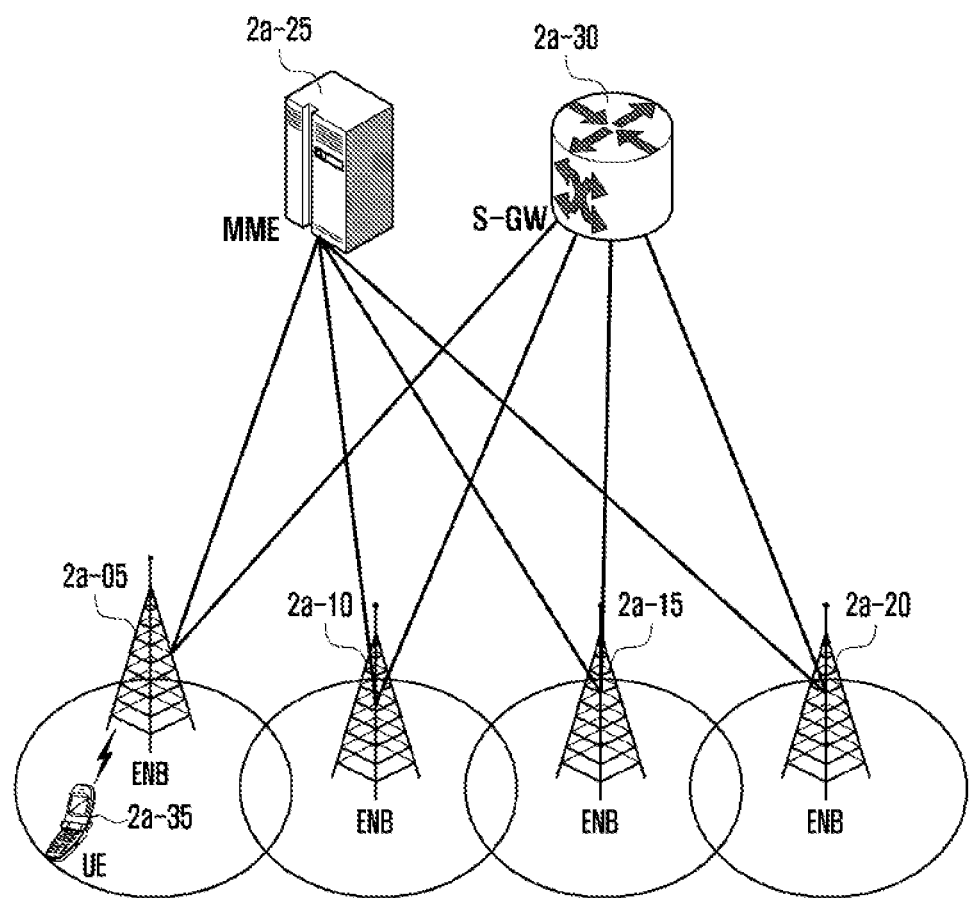
FIG. 2A is a diagram illustrating the configuration of an LTE system according to an embodiment of the present disclosure.

FIG. 2A is a diagram illustrating the configuration of an LTE system according to an embodiment of the present disclosure.

Referring to FIG. 2A, the radio access network of the LTE system includes next-generation evolved Node B (hereinafter referred to as "eNBs", "Node Bs" or "base stations") 2a-05, 2a-10, 2a-15, and 2a-20, a mobility management entity (MME) 2a-25, and a serving gateway (S-GW) 2a-30. A user equipment (hereinafter referred to as a "UE" or "terminal") 2a-35 accesses an external network through the eNB 2a-05, 2a-10, 2a-15 or 2a-20 and the S-GW 2a-30.

In FIG. 2A, the eNBs 2a-05, 2a-10, 2a-15, and 2a-20 correspond to the Node Bs of the existing UMTS system. The eNB 2a-05 is connected to the UE 2a-35 through a radio channel and performs a more complex function than the existing Node B. In the LTE system, all of types of user traffic including a real-time service, such as voice over IP (VoIP), through the Internet protocol, are served through a shared channel. Accordingly, a device that performs schedules by collecting state information, such as the buffer state, available transmission power state, and channel state of UEs, may be necessary. The eNBs 2a-05, 2a-10, 2a-15, and 2a-20 are in charge of such a device. In general, one eNB controls multiple cells. For example, in order to implement the transfer rate of 100 Mbps, the LTE system uses OFDM as a radio access technology in the 20 MHz bandwidth, for example. Furthermore, the LTE system adopts an AMC scheme for determining a modulation scheme and a channel coding rate based on the channel state of a UE. The S-GW 2a-30 provides a data bearer and generates or removes a data bearer under the control of an MME 2a-25. The MME is in charge of various control functions in addition to a mobility management function for a UE, and is connected to multiple eNBs.

Figure 2B:
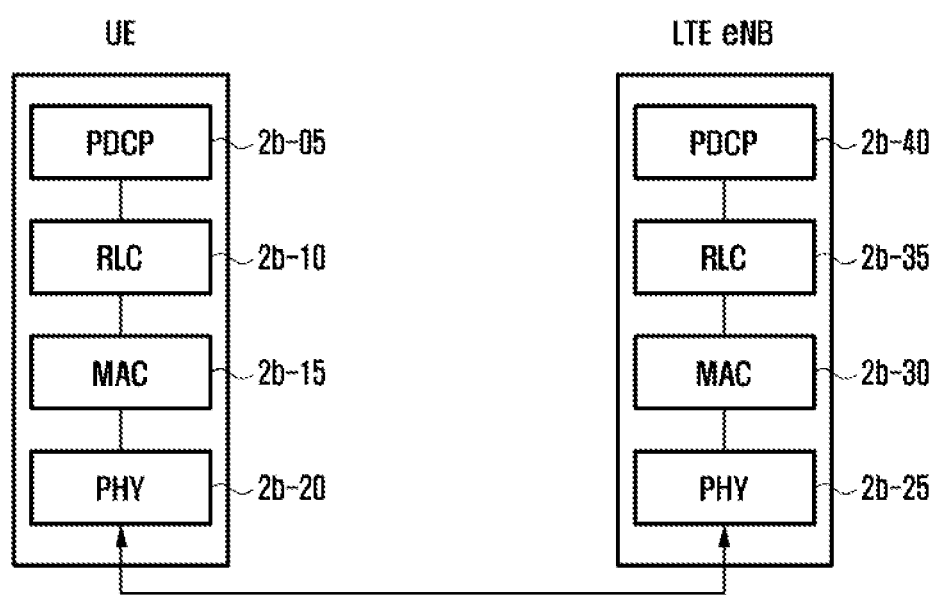
FIG. 2B is a diagram illustrating radio protocol architecture in the LTE system according to an embodiment of the present disclosure.

FIG. 2B is a diagram illustrating radio protocol architecture in the LTE system according to an embodiment of the present disclosure.

Referring to FIG. 2B, the radio protocol of the LTE system includes packet data convergence protocols (PDCPs) 2b-05 and 2b-40, radio link control (RLC) 2b-10 and 2b-35, and medium access control (MAC) 2b-15 and 2b-30 in a UE and an eNB, respectively. The PDCPs 2b-05 and 2b-40 are in charge of an operation, such as IP header compression/restoration. Major functions of the PDCP 2b-05, 2b-40 are summarized as follows.
Header compression and decompression: ROHC only
Transfer of user data
In-sequence delivery of upper layer PDUs in a PDCP re-establishment procedure for RLC AM
Reordering function (for split bearers in DC (only support for RLC AM): PDCP PDU routing for transmission and PDCP PDU reordering for reception)
Duplicate detection of lower layer SDUs in a PDCP re-establishment procedure for RLC AM
Retransmission of PDCP SDUs at handover and, for split bearers in DC, of PDCP PDUs in a PDCP data-recovery procedure, for RLC AM
Ciphering and deciphering
Timer-based SDU discard in uplink The RLC 2b-10, 2b-35 reconfigures a PDCP packet data unit (PDU) in a proper size and performs an ARQ operation. Major functions of the RLC are summarized as follows.

Transfer of upper layer PDUs
ARQ function (Error Correction through ARQ (only for AM data transfer))
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 2b-15, 2b-30 is connected to multiple RLC layer devices configured in one UE, and performs an operation of multiplexing RLC PDUs with a MAC PDU and demultiplexing RLC PDUs from a MAC PDU. Major functions of the MAC are summarized as follows.
Mapping between logical channels and transport channels
Multiplexing/demultiplexing of MAC SDUs belonging to one or different logical channels into/from transport blocks (TB) delivered to/from the physical layer on transport channels)
Scheduling information reporting
Error correction through HARQ
Priority handling between logical channels of one UE
Priority handling between UEs by means of dynamic scheduling
MBMS service identification
Transport format selection
Padding A physical layer 2b-20, 2b-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OPDM symbol to a higher layer.

Figure 2C:
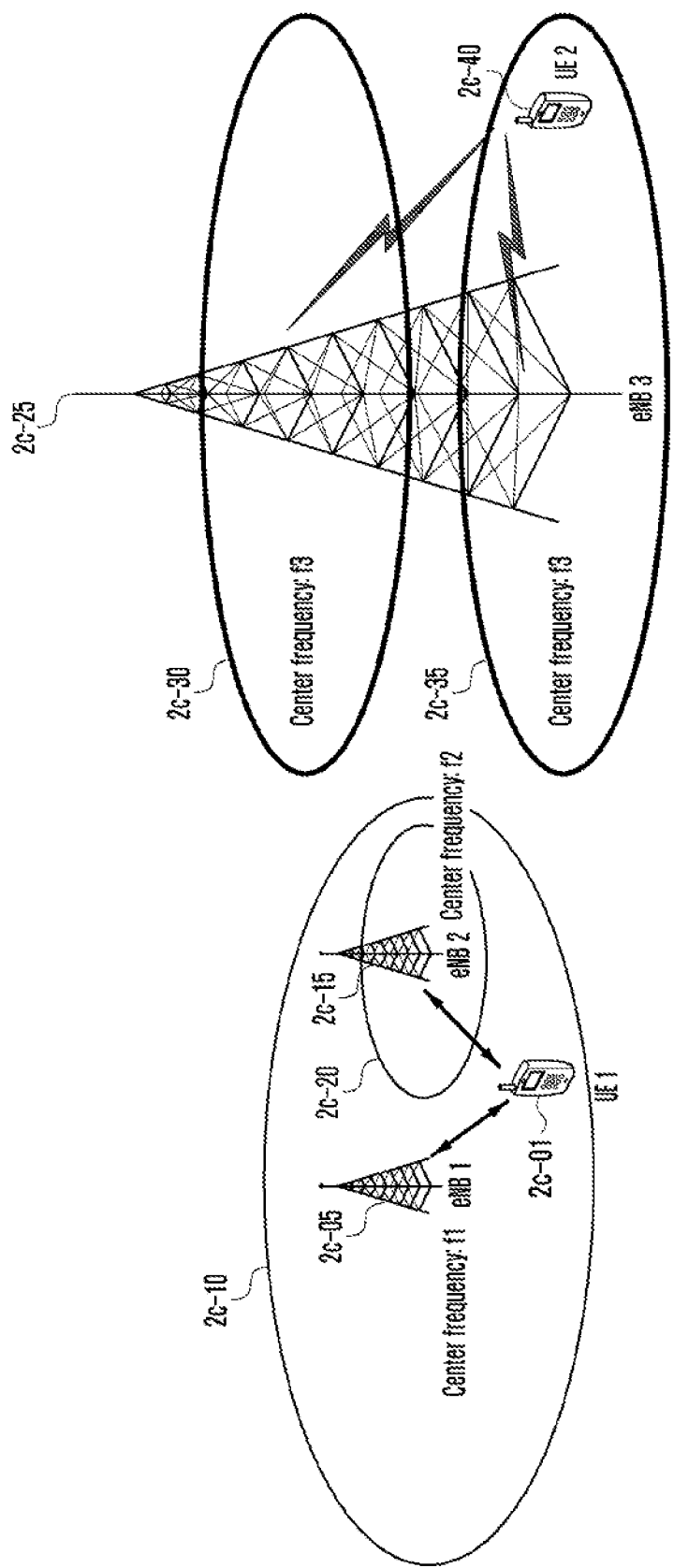
FIG. 2C is a diagram schematically illustrating a dual connectivity and carrier operation in the LTE system according to an embodiment of the present disclosure.

FIG. 2C is a diagram schematically illustrating a dual connectivity and carrier operation in the LTE system according to an embodiment of the present disclosure.

Referring to FIG. 2C, assuming that an eNB 1 2c-05 transmits/receives a carrier having a center frequency of f1 and an eNB 2 2c-15 transmits/receives a carrier having a center frequency of f2, when a UE 1 2c-01 combines the carrier having the forward center frequency of f1 and the carrier having the forward center frequency of f2, one UE may transmit/receive data to/from two or more eNBs. The LTE system supports such an operation, which is called dual connectivity (hereinafter referred to as "DC").

Furthermore, in general, a single eNB 3 2c-25 may transmit/receive multiple carriers in multiple frequency bands. For example, when the eNB 3 2c-25 transmits a carrier 2c-30 having a forward center frequency of f3 and a carrier 2c-35 having a forward center frequency of f4, in a conventional technology, a single UE transmits/receives data using one of the two carriers. However, a UE 2 2c-40 having the carrier aggregation ability may transmit/receive data through multiple carriers at the same time. The eNB 3 2c-25 may assign more carriers to the UE 2 2c-40 having the carrier aggregation ability according to situations, thereby being capable of improving the transfer rate of the UE 2 2c-40. To aggregate a forward carrier and a backward carrier transmitted and received by a single eNB as described above is called a carrier aggregation (CA) within the eNB. In a traditional meaning, assuming that one forward carrier transmitted by one eNB and one backward carrier received by the eNB form a single cell, a carrier aggregation may be understood that a UE transmits/receives data through multiple cells at the same time. Accordingly, a maximum transfer rate increases in proportion to the number of aggregated carriers.

In the following embodiments of the present disclosure, the meaning that a UE receives data through a specific forward carrier or transmits data through a specific uplink carrier is the same as that the data is transmitted/received using a control channel and data channel provided by a cell corresponding to a center frequency and frequency band that characterize the carrier. In embodiments of the present disclosure, a set of serving cells controlled by the same eNB is defined as a cell group (CG). The cell group is divided into a master cell group (MCG) and a secondary cell group (SCG). The MCG means a set of serving cells controlled by an eNB controlling a primary cell (PCell) (i.e., a master eNB (MeNB)). The SCG means a set of serving cells controlled by an eNB other than an eNB that controls a PCell, that is, an eNB controlling only secondary cells (SCells) (i.e., a secondary eNB (SeNB)). An eNB notifies a UE whether a given serving cell belongs to an MCG or an SCG in a process of configuring the corresponding serving cell.

A PCell and an SCell are terms indicative of the type of serving cell configured in a UE. The PCell and the SCell have some differences. For example, the PCell maintains the activation state, but the SCell repeats the activation state and the deactivation state in response to an instruction from an eNB. The mobility of a UE is controlled based on a PCell, and an SCell may be understood as an additional serving cell for data transmission/reception. In embodiments of the present disclosure, a PCell and an SCell means the PCell and the SCell defined in the LTE standard 36.331 or 36.321. The terms have the same meanings as those used in the LTE mobile communication system without any change. In one embodiment of the present disclosure, the terms, such as a carrier, a component carrier and a serving cell, are interchangeably used.

Referring back to FIG. 2C, if the eNB 1 2c-05 is an MeNB and the eNB 2 2c-15 is an SeNB, a serving cell 2c-10 having the center frequency f1 is a serving cell belonging to an MCG, and a serving cell 2c-20 having the center frequency f2 is a serving cell belonging to an SCG. Furthermore, it may be practically impossible to transmit HARQ feedback and channel state information (hereinafter referred to as "CSI") of SCG SCells through a physical uplink control channel (PUCCH) of a PCell. HARQ feedback needs to be transmitted within a HARQ round trip time (RTT) (in general 8 ms). The reason for this is that transmission delay between an MeNB and an SeNB may be longer than the HARQ RTT. Due to the problem, a PUCCH transmission resource is configured in one of SCells belonging to an SCG, that is, a primary SCell (PSCell), and HARQ feedback and CSI of SCG SCells are transmitted through the PUCCH.

Furthermore, in a common CA within the eNB 3 2c-25, the UE 2 2c-40 transmits HARQ feedback and CSI for an SCell in addition to HARQ feedback and CSI for a PCell through a PUCCH of the PCell. The reason for this is that a CA operation is to be applied to a UE incapable of uplink simultaneous transmission. In LTE Rel-13 enhanced CA (eCA), an additional SCell having a PUCCH is defined and 32 carriers may be aggregated.

Figure 2D:
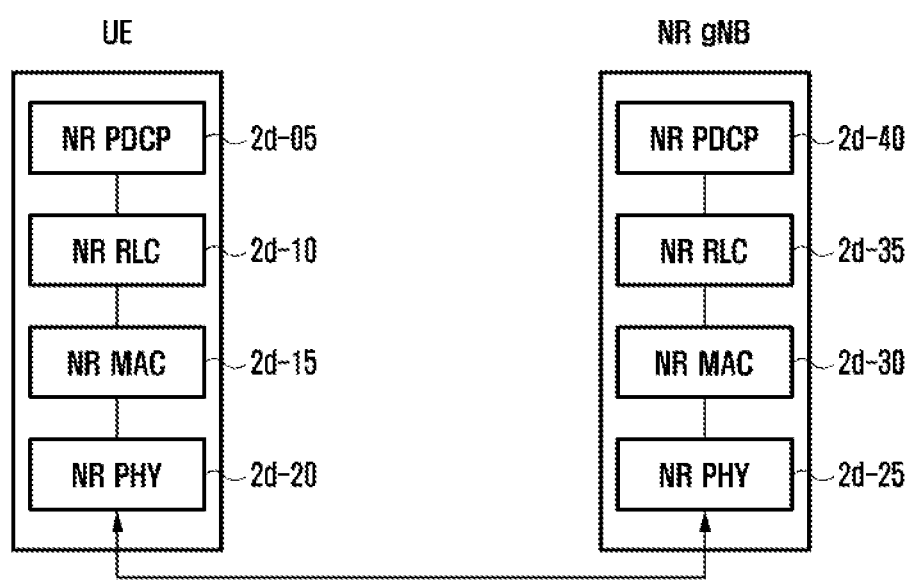
FIG. 2D is a diagram illustrating radio protocol architecture of a next-generation mobile communication system according to an embodiment of the present disclosure.

FIG. 2D is a diagram illustrating radio protocol architecture of a next-generation mobile communication system according to an embodiment of the present disclosure.

Referring to FIG. 2D, the radio protocol of the next-generation mobile communication system includes NR PDCPs 2d-05 and 2d-40, NR RLC 2d-10 and 2d-35, and NR MAC 2d-15 and 2d-30, respectively, in a UE and an NR NB. Major functions of the NR PDCP 2d-05, 2d-40 may include some of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink The reordering function of the NR PDCP device refers to a function of sequentially reordering PDCP PDUs received from a lower layer based on a PDCP sequence number (SN). The reordering function may include a function of transmitting data in a reordered sequence to a higher layer or a function of directly transmitting the data to a higher layer without taking the order into consideration, a function of reordering orders and recording lost PDCP PDUs, a function of making a status report on lost PDCP PDUs to the transmission side, and a function of requesting the retransmission of lost PDCP PDUs.

Major functions of the NR RLC 2d-10, 2d-35 may include some of the following functions.

Transfer of upper layer PDUs
    In-sequence delivery of upper layer PDUs
    Out-of-sequence delivery of upper layer PDUs
    Error Correction through ARQ
    Concatenation, segmentation and reassembly of the RLC SDUs
    Re-segmentation of RLC data PDUs
    Reordering of RLC data PDUs
    Duplicate detection
    Protocol error detection
    RLC SDU discard
    RLC re-establishment The in-sequence delivery function of the NR RLC device refers to a function of sequentially transmitting RLC SDUs received from a lower layer to a higher layer, and may include a function of reassembling and transmitting multiple RLC SDUs if one RLC SDU has been originally segmented into the multiple RLC SDUs and received. The in-sequence delivery function may include a function of reordering received RLC PDUs based on an RLC sequence number (SN) or a PDCP sequence number (SN), a function of reordering orders and recording lost RLC PDUs, a function of transmitting a status report on lost RLC PDUs to the transmission side, a function of requesting the retransmission of lost RLC PDUs, a function of sequentially transmitting only RLC SDUs prior to a lost RLC SDU to a higher layer when the lost RLC SDU occurs, a function of sequentially transmitting all of RLC SDUs received until a given timer expires to a higher layer when the timer expires although there is a lost RLC SDU, and a function of sequentially transmitting all of RLC SDUs received so far to a higher layer when a given timer expires although there is a lost RLC SDU. Furthermore, the in-sequence delivery function may include a function of processing RLC PDUs in order that the RLC PDUs are received (in order of arrival regardless of the order of a serial number and sequence number) and transmitting the RLC PDUs to a PDCP device regardless of their orders (i.e., out-of-sequence delivery). The in-sequence delivery function may include a function of receiving segments stored in a buffer or segments to be received subsequently, reconfiguring the segments in one complete RLC PDU, processing the RLC PDU, and transmitting the RLC PDU to the PDCP device. The NR RLC layer may not include a concatenation function. The concatenation function may be performed by the NR MAC layer or may be substituted with the multiplexing function of the NR MAC layer.

The out-of-sequence delivery function of the NR RLC device refers to a function of directly transmitting RLC SDUs received from a lower layer to a higher layer regardless of their orders. The out-of-sequence delivery function may include a function of reassembling multiple RLC SDUs if one RLC SDU has been originally segmented into the multiple RLC SDUs and received. The out-of-sequence delivery function may include a function of storing the RLC SNs or PDCP SNs of received RLC PDUs, reordering their orders, and recording lost RLC PDUs.

The NR MAC 2d-15, 2d-30 may be connected to multiple NR RLC layer devices configured in one UE. Major functions of the NR MAC may include some of the following functions.

Mapping between logical channels and transport channels
Multiplexing/demultiplexing of the MAC SDUs
Scheduling information reporting
Error correction through HARQ
Priority handling between logical channels of one UE
Priority handling between the UEs by means of dynamic scheduling
MBMS service identification
Transport format selection
Padding An NR PHY layer 2d-20, 2d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Table 2-1 describes pieces of information that may be included in the MAC header.

TABLE 2-1

Variables of MAC header

| Variable | Usage |
| --- | --- |
| Logical channel identifier (LCD) | LCID may indicate the identifier of an RLC entity that has generated an RLC PDU(or MAC SDU) received from a higher layer. Alternatively, the LCID may indicate a MAC control element (CE) or padding. Furthermore, the LCID may be differently defined based on a transmitted channel. For example, the LCID may be differently defined based on a downlink-shared channel (DL-SCH), an uplink-shared channel (UL-SCH) or a multicast channel (MCH). |
| L | Indicate the length of an MAC SDU and may indicate the length of a MAC CE having a variable length. In the case of a MAC CE having a fixed length, the L-field may be omitted. The L-field may be omitted for a given reason. The given reason refers to a case where the size of a MAC SDU is fixed, the transmission side notifies the reception side of the size of a MAC PDU, or the reception side can calculate the length through calculation. |
| F | Indicate the size of an L-field. A case where the L-field is not present may be omitted. If the F-field is present, the size of the L-field may be limited to a given size. |
| M | Indicate whether a tail indicator, that is, an indicator for providing notification of the start position of a MAC CE, is present. Given bits of the first MAC sub-header in a MAC PDU may be indicated as tail indicator existence. |
| R | Reserved bits |

Figure 2E:
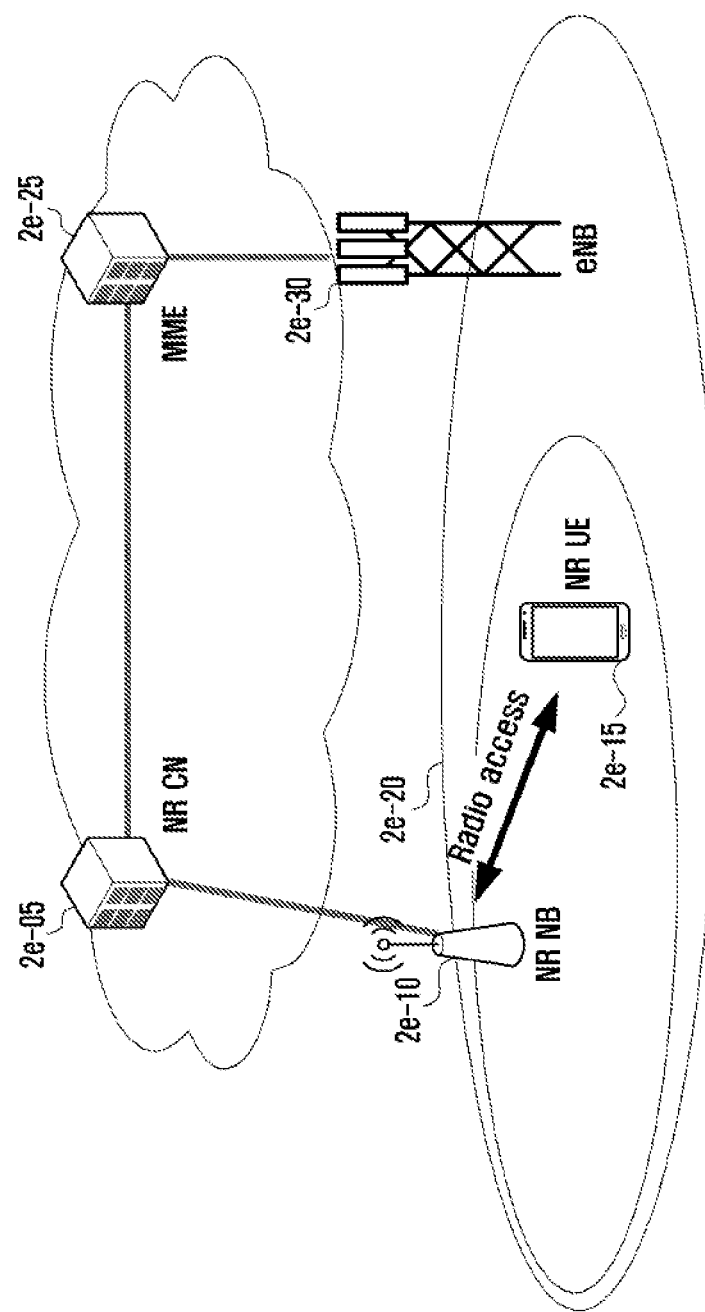
FIG. 2E is a diagram illustrating the configuration of a next-generation mobile communication system according to an embodiment of the present disclosure.

FIG. 2E is a diagram illustrating the configuration of a next-generation mobile communication system according to an embodiment of the present disclosure.

Referring to FIG. 2E, the radio access network of the next-generation mobile communication system includes a new radio Node B (hereinafter referred to as an "NR NB") 2e-10 and a new radio core network (NR CN) 2e-05. A new radio user equipment (hereinafter referred to as an "NR UE" or a "NR terminal") 2e-15 accesses an external network through the NR NB 2e-10 and the NR CN 2e-05.

In FIG. 2E, the NR NB 2e-10 corresponds to an evolved Node B (eNB) of the existing LTE system. The NR NB 2e-10 is connected to the NR UE 2e-15 through a radio channel, and may provide excellent services compared to the existing Node B. The next-generation mobile communication system requires a device for performing scheduling by collecting state information, such as the buffer state, available transmission power state, and channel state of UEs, because all of types of user traffic are served through a shared channel. The NR NB 2e-10 is in charge of the device. In general, one NR NB controls multiple cells. In order to implement super-high speed data transmission compared to the existing LTE, the next-generation mobile communication system may have the existing maximum bandwidth or more and may additionally graft the beamforming technology using OFDM as a radio access technology. Furthermore, the next-generation mobile communication system adopts the AMC scheme that determines a modulation scheme and a channel coding rate based on the channel state of a UE. The NR CN 2e-05 performs functions, such as mobility support, a bearer configuration, and a QoS configuration. The NR CN 2e-05 is in charge of various control functions in addition to a mobility management function for a UE, and is connected to multiple eNBs. Furthermore, the next-generation mobile communication system may also operate in conjunction with the existing LTE system. The NR CN 2e-05 is connected to an MME 2e-25 through a network interface. The MME 2e-25 is connected to an eNB 2e-30 that is the existing eNB.

Figure 2F:
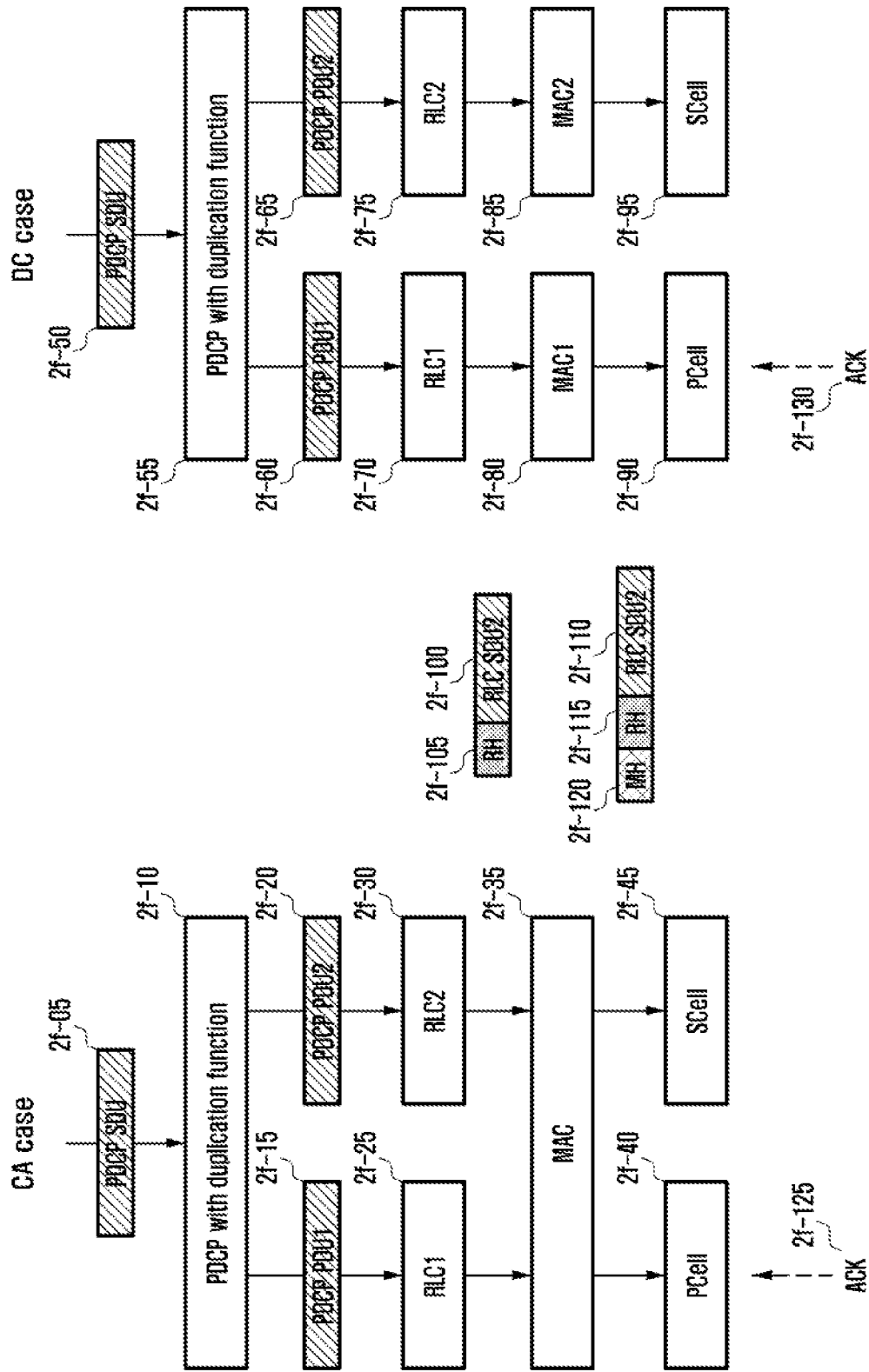
FIG. 2F is a diagram schematically illustrating data transmission through packet duplication taken into consideration in an embodiment of the present disclosure and showing a process for a UE to process a duplicated packet based on various conditions proposed in the present embodiment.

FIG. 2F is a diagram schematically illustrating data transmission through packet duplication taken into consideration in an embodiment of the present disclosure and showing a process for a UE to process a duplicated packet based on various conditions proposed in the present embodiment.

The present disclosure relates to a method of transmitting duplicated data through a path (or indicated as a "leg") different from that of the original packet when a UE performs ultra-reliable low latency communication (URLLC) in a next-generation mobile communication system. In one embodiment of the present disclosure, URLLC is described as an example, and packet duplication of the present disclosure is not limited to URLLC. If duplicated data is assigned as the same MAC PDU, duplication transmission is difficult. Accordingly, if a packet is duplicated, dual connectivity (DC) or a carrier aggregation (CA) may be basically used. That is, a secondary gNB (SgNB) or SCell configuration must have been performed on a UE so that it can support dual connectivity or a carrier aggregation. In one embodiment of the present disclosure, a situation in which dual connectivity and a carrier aggregation have been configured in a UE is assumed. A basic principle is described through a packet processing method for each type of protocol architecture in each case.

Referring back to FIG. 2F, an eNB or a UE receives a data packet for URLLC, that is, a PDCP SDU, from a higher layer (steps 2f-05, 2f-50) and transmits the data packet to the PDCP layer. At operations 2f-10 and 2f-55, the PDCP layer determines whether to duplicate the data packet. If duplication is necessary, the PDCP layer generates an original PDCP PDU1 and a duplicated PDCP PDU2 (steps 2f-15, 2f-20 and 2f-60, 2f-65) and transmits them to the RLC layer (steps 2f-25, 2f-30 and 2f-70, 2f-75). The determination of the packet duplication is based on a packet duplication activation/deactivation MAC CE (hereinafter referred to as a "Du A/D MAC CE") received from the eNB. The RLC1 and the RLC2 of each serving cell transmits the received data packets to the MAC layer of an MgNB or the UE. The MAC layer maps the packet data, received at operations 2f-35, 2f-80, and 2f-85 (one MAC may be present in the case of CA, and tow MACs may be present in the case of DC), to a proper logical channel group (LCG), generates an MAC PDU, and transmits it to the physical layer of a corresponding serving cell (steps 2f-40, 2f-45 and 2f-90, 2f-95). Thereafter, the physical layer transmits an MAC PDU received through a corresponding carrier aggregation or dual connectivity. In a reception process, the reverse process of the transmission process is performed without any change. That is, the physical layer receives the data packet (i.e., MAC PDU) through corresponding serving cells and transmits it to the MAC layer of the UE or a corresponding eNB. Thereafter, a PDCP PDU1 and a PDCP PDU2 through the RLC gather at the PDCP of the UE or the eNB. The PDCP layer checks the sequence numbers (SNs) of the received original packet and the duplicated packet, deletes one of them when the same packet is reached, and transmits it to a higher layer.

In performing the operation, in the present embodiment, two situations are defined and how the UE will operate in a corresponding situation is defined.

First, when the UE receives a packet duplication deactivation MAC CE from the eNB, there is a problem in that how the duplication packet stored in the RLC or the MAC will be processed at a corresponding occasion. In the condition, the UE operates differently based on an RLC transmission mode.

1. In the Case of an RLC Unacknowledged Mode (UM):

An RLC PDU/MAC SDU that belongs to an RLC PDU/MAC SDU 2f-100 and 2f-105 pre-processed for duplication transmission and that has been stored in another leg (or path) other than a preferred leg (or path) is not transmitted and discarded 2. In the Case of an RLC Acknowledged Mode (AM):

Transmission needs to continue because SN information of an RLC header may be necessary a. Transmission without any change: an RLC PDU/MAC SDU or an MAC PDU 2f-100, 2f-105 or 2f-110, 2f-115, 2f-120 stored in the buffer is transmitted without any change. Include retransmission according to ACK 2f-125, 2f-130/NACK b. Header-only packet transmission: Transmit only the RLC header 2f-115 and the MAC header 2f-120 other than payload c. Retransmission discard: the meaning that the eNB has deactivated packet duplication through an MAC CE means that it will no longer receive data through a corresponding path. Although a mode is the RLC AM mode, a transmission stage discards he RLC PDU and the MAC SDU stored in the RLC and the MAC. That is, when the UE receives deactivation indication for a given path through MAC CE deactivation from the eNB, the UE discards an RLC PDU/MAC SDU that belongs to the RLC PDU/MAC SDU 2f-100 and 2f-105 already pre-processed for duplication transmission and that is stored in another leg (or path) other than a preferred leg (or path) without transmitting it.

Second, a packet duplication operation is configured in the UE from the eNB through a carrier aggregation (CA) or dual connectivity (DC). If successful transmission is confirmed based on RLC ACK in one link with respect to a given PDCP while the UE operates, there is a problem in that how an operation in the other link will be defined. In the problem, a duplicated packet may have a later transmission occasion than the original data because a regular buffer status report (BSR) is late triggered due to priority in logical channel prioritization (LCP). Specifically, in the case of packet duplication through DC, the original data packet and a duplicated data packet may be transmitted/received at different occasions because the packet duplication is processed in another MAC.

1. If a duplicated packet to be transmitted through another link has not yet been transmitted from the PDCP layer to the RLC layer, A. Stop Transmission 2. If a duplicated packet to be transmitted through another link has been transmitted from the PDCP layer to the RLC layer or the MAC layer and pre-processed, A. Transmission without any change: the RLC PDU/MAC SDU or the MAC PDU 2f-100, 2f-105 or 2f-110, 2f-115, 2f-120 stored in the buffer is transmitted without any change.

B. Only the RLC header 2f-115 and the MAC header 2f-120 other than header-only packet transmission payload are transmitted FIG. 2G is a diagram illustrating the structure of a packet duplication activation/deactivation MAC CE according to an embodiment of the present disclosure.

First, an eNB configures that which bearer or logical channel id (LCID) may be used for packet duplication through an RRC configuration with respect to a UE. Thereafter, the eNB may use an MAC CE in order to activate/deactivate packet duplication corresponding to a specific bearer or LCID of the configured bearers or LCIDs with respect to the UE. In one embodiment of the present disclosure, a method of activating/deactivating packet duplication through the MAC CE is divided into two cases.

First, there is a method using the Du A/D MAC CE for each UE. In this case, a UE that has received a Du A/D MAC CE activates/deactivates packet duplication for all of bearers or LCIDs previously configured for the packet duplication. In such a case, the Du A/D MAC CE may be used as an MAC CE including only a header without payload (Case 1: MAC CE per UE). That is, the Du A/D MAC CE includes only an LCID 2g-15 and reserved bits (R) 2g-40 only. To this end, the LCID (6 bits) and the Du A/D MAC CE need to be mapped.

Second, there is a method using the Du A/D MAC CE for each resource bearer or radio bearer (RB). In this case, a UE that has received a Du A/D MAC CE activates/deactivates packet duplication for only a given RB of bearers or LCIDs previously configured for packet duplication. Furthermore, the method may operate differently depending on whether the bearer is a DRB or an SRB. A Du A/D MAC CE for an SRB may have the same structure as Case 1: MAC CE per UE. That is, the Du A/D MAC CE for an SRB may use a header-only MAC CE not having payload. When a UE receives a Du A/D MAC CE in which an LCID has been mapped to the activation deactivation of packet duplication, it may activate or deactivate the packet duplication of an SRB. In contrast, a Du A/D MAC CE for a DRB needs to be designated regarding that which RB will be activated or deactivated through payload. To this end, an embodiment of the present disclosure proposes two structures.

Case 2-1 (MAC CE per RB): The LCID 2g-15 of 6 bits is mapped to a Du A/D MAC CE, and an F field 2g-20 and an L field 2g-25 may be present. Furthermore, the ID 2g-30, 2g-35 of a beater that needs to be activated or deactivated may be designated. The bearer ID may have 1 byte, and the size of an MAC CE may vary depending on the number of designated bearers.

Case 2-2 (MAC CE per RB): An LCID 2g-45 of 6 bits is mapped to a Du A/D MAC CE, and an F field 2g-50 and an L field 2g-55 may be present. Furthermore, a DRB that needs to be activated or deactivated may be designated in a 1-byte bitmap format. In a bitmap 2g-60, B0 is mapped to a DRB that belongs to packet duplication-configured split bearers configured in a UE and that has the lowest DRB id, and B1 is the second-lowest DRB and a total of 8 DRBs may be designated.

Figure 2H:
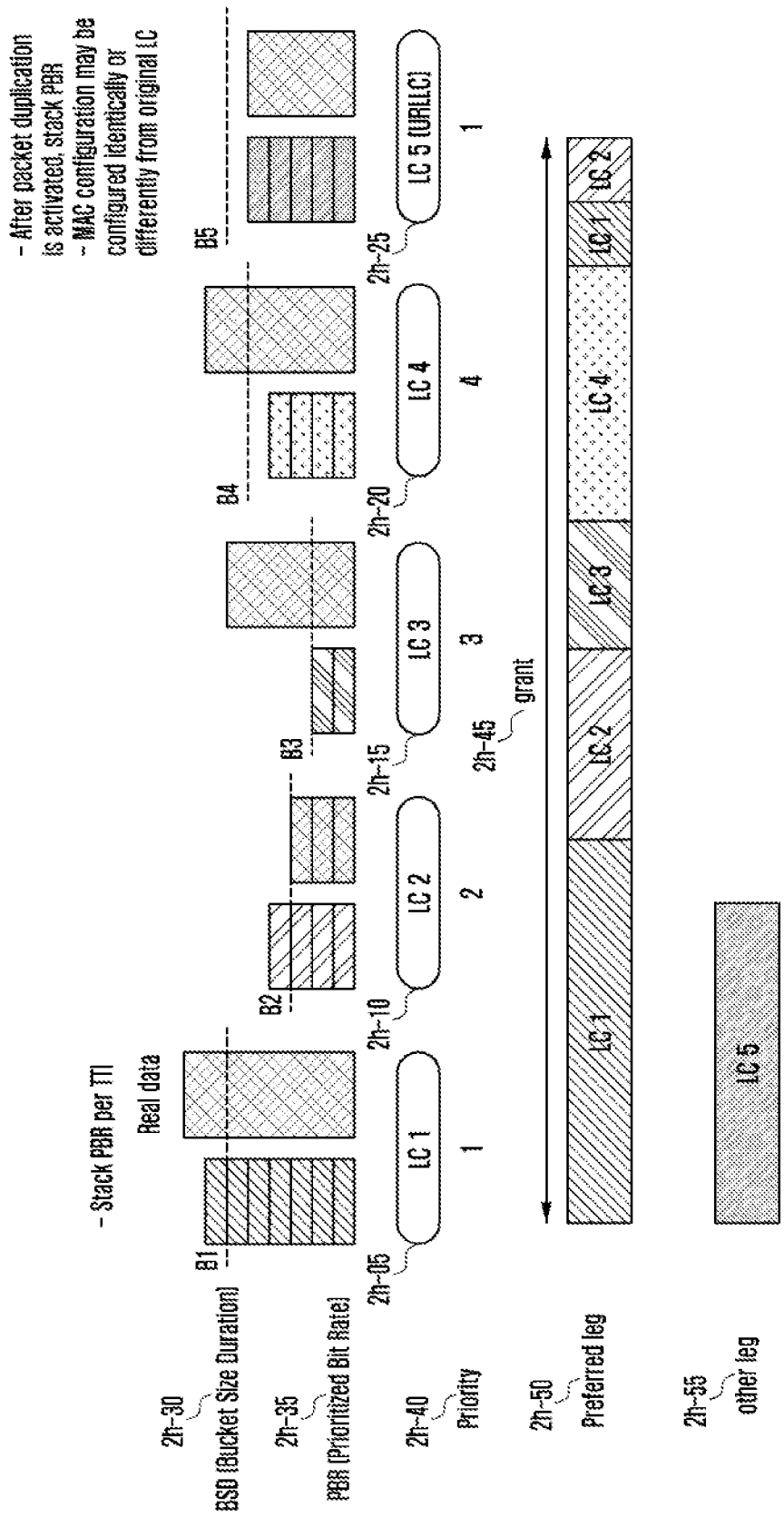
FIG. 2H is a diagram illustrating an operation in the MAC after packet duplication is activated or deactivated according to an embodiment of the present disclosure.

FIG. 2H is a diagram illustrating an operation in the MAC after packet duplication is activated or deactivated according to an embodiment of the present disclosure.

FIG. 2H shows a logical channel prioritization (LCP) operation in the MAC taken into consideration in one embodiment of the present disclosure. The operation refers to an LCP in LTE and is different from the existing LTE operation in that it solves a problem that may occur when the existing LTE operation is performed for packet duplication without any change.

In the MAC of a UE, when a bearer configuration with an eNB is completed, a data packet is stacked at a prioritized bit rate (PRB) 2h-35 set in each of logical channels (LCs) 2h-05, 2h-10, 2h-15, 2h-20, 2h-25 every transmission time interval (TTI) with respect to the configured bearer. The operation is performed per LC and is repeated during bucket size duration (BSD) 2h-30, that is, another set value. If packets are stacked during BSD set in a given LC, the operation is stopped until the packets are emptied. Furthermore, the LCP operates based on priority 2h-40. An example in FIG. 2H is described. For packet duplication for an LC 1, an LC 5 is configured with the same priority at the same PBR and BSD. The parameters may be set as different values. The remaining LCs 2, 3 and 4 have respective priorities, PBRs, and BSDs. In LTE, the LCs and the parameters of each LC are together configured when an eNB performs a bearer configuration for a UE. The PBR is stacked every TTI simultaneously with an RRC configuration. However, if such an operation is performed, although packet duplication activation has not actually started in the LC 5 whose packet duplication has been configured, the PBR is stacked. If packet duplication is activated through a Du A/D MAC CE over time, all of previously stacked PBRs are used for a BSR request. Such an operation is not suitable for the purpose of the introduction of activation/deactivation. Accordingly, the UE may have to stack the PBR for the LC5 (LC for packet duplication) from the time when the Du A/D MAC CE is received.

After an LCP operation in the situation to which such packet duplication has been applied, the UE requests the BSR from the eNB, and stores data in a grant received from the eNB according to an LCP procedure. The LCP procedure may refer to the procedure in LTE and may follow the following sequence in summary.

1. Sequentially stores data stored for each LC priority (cannot exceed BSD for each LC).
2. Stores data for all valid LCs and if a grant remains, store all of data for an LC having high priority and apply the same to next priorities.
3. In the case of an LC to which packet duplication is applied, performs an LCP operation after receiving the activation indication of a Du A/D MAC CE.
4. Store a packet duplication packet and the original packet in different grants (2h-50, 2h-55).

Figure 2I:
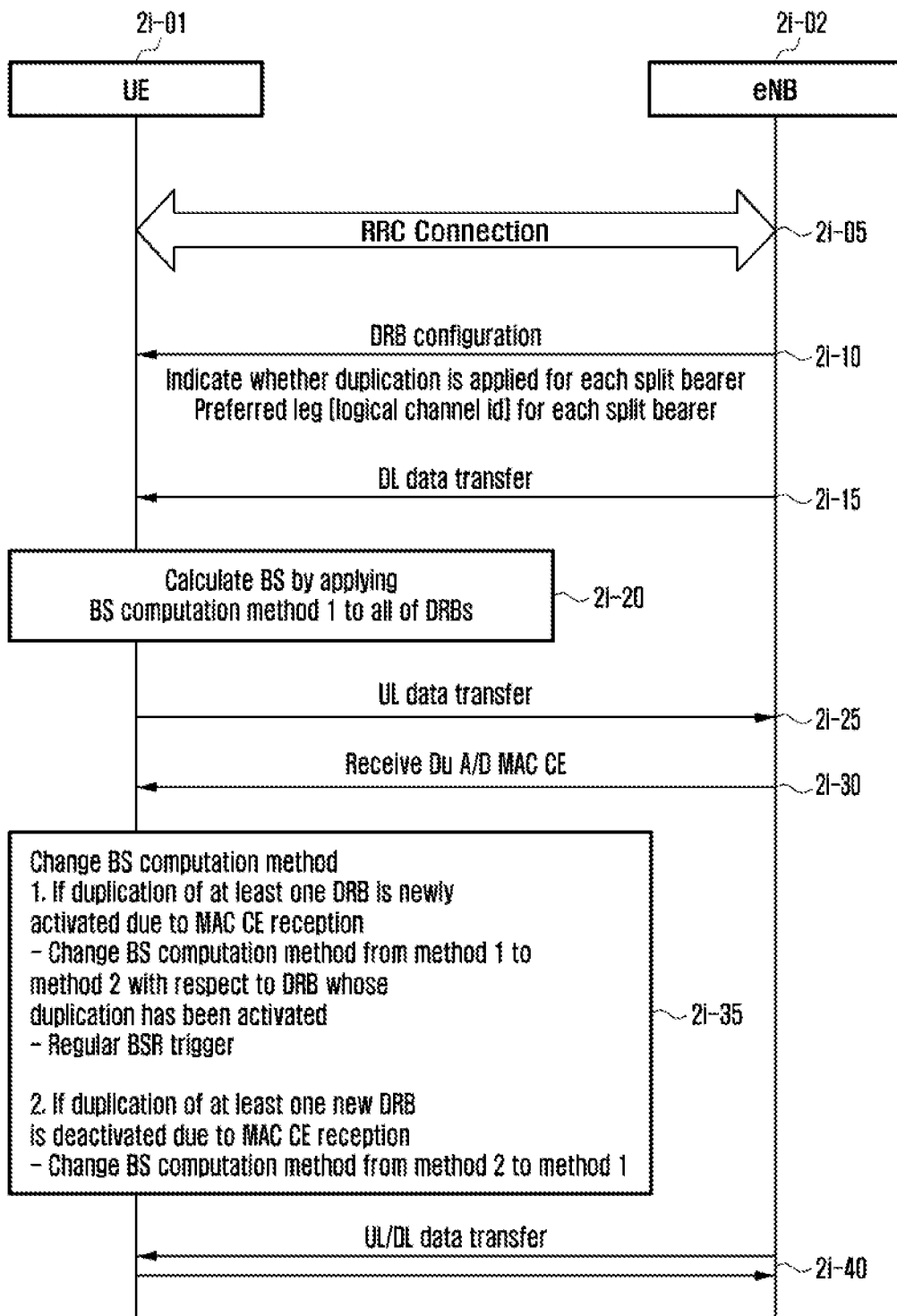
FIG. 2I is a diagram illustrating an overall operation regarding the reception of a packet duplication activation/deactivation MAC CE by a UE according to an embodiment of the present disclosure.

FIG. 2I is a diagram illustrating an overall operation regarding the reception of a packet duplication activation/deactivation MAC CE by a UE according to an embodiment of the present disclosure.

A UE 2i-01 establishes an RRC connection with an eNB 2i-02 for data transmission/reception (2i-05), and receives an RRC message including a bearer configuration for URLLC from the eNB 2i-02 (2i-10). For the operation, a CA or DC may be configured. If the CA is applied, a bearer that belongs to bearers of an SCell and that is configured for URLLC transmission may be additionally configured, and an additional LCG cell group and a serving cell may be configured. If the DC is applied, a bearer for URLLC and a serving cell configuration may be included in a configuration for an SCG bearer. Furthermore, in a DRB configuration, whether to apply duplication is indicated for each split bearer, and a preferred path may be configured for each split bearer. That is, the path may be designated as a path that is mapped to a given logical channel id and along which a given service is transmitted. Alternatively, the preferred path may be used to designate a path along which the original data packet is transmitted, and may also be used to indicate that which path is better if two paths have good quality.

Thereafter, the UE 2i-01 performs uplink/downlink data transmission along with the eNB 2i-02 (2i-15, 2i-25). In the case of the downlink, the eNB 2i-02 may immediately perform a downlink packet duplication operation on a split bearer whose packet duplication has been configured. In contrast, in the case of uplink packet duplication, uplink packet duplication is not applied in this operation because it is performed after activation/deactivation is indicated through a Du A/D MAC CE. In the above operation, the UE 2i-01 applies a buffer status (BS) computation method 1 to all of DRBs for uplink data transmission (2i-20). In the BS computation method 1, when the PDCP data volume of a split DRB is calculated, the BS is calculated by taking into consideration only the PDCP data volume of a referred logical channel.

The eNB 2i-02 may indicate packet duplication for a DRB previously configured in the UE 2i-01 through a Du A/D MAC CE for a given reason (2i-30). The given reason may include that the eNB 2i-02 determines transmission link quality of the UE 2i-01 and determines that packet duplication is necessary or that a necessity for an URLLC mode may be determined based on an implementation of the eNB 2i-02 with respect to a given service mapped to an LC. After receiving a Du A/D MAC CE, the UE 2i-01 may perform the following operation depending on a condition (2i-35).

1. If the duplication of at least one DRB has been newly activated due to MAC CE reception:
    Change the BS computation method from a method 1 to method 2 with respect to a DRB whose duplication has been activated
    Regular BSR trigger
2. If the duplication of at least one new DRB has been deactivated due to MAC CE reception:
    Change the BS computation method from the method 2 to the method 1
    In the case of an RLC UM DRB, discard an RLC PDU and an MAC SDU pre-processed in a non-preferred logical channel In the case of an RLC AM DRB, transmit an RLC PDU and MAC SDU pre-processed in a non-preferred logical channel without any change or transmit a header-only packet other than payload In this case, the BS computation method 1 means that the PDCP data volume of a split DRB is taken into consideration in a BS for a preferred logical channel when the PDCP data volume is calculated. The BS computation method 2 means that the PDCP data volume of a split DRB is taken into consideration when the PDCP data volume is calculated with respect to both the BS of a preferred logical channel and the BS of a non-preferred logical channel. Unlike the method, as an alternative solution, the MAC may notify the PDCP of an A/D situation, and the PDCP may properly notify the PDCP data volume of the MAC based on a situation.

Thereafter, at operation 2i-40, the UE performs uplink/downlink data transmission along with the eNB.

FIG. 2J is a diagram illustrating an operation for a UE to perform packet duplication according to an embodiment of the present disclosure.

A UE establishes an RRC connection with an eNB for data transmission/reception (2j-05), and receives an RRC message including a bearer (DRB) configuration for URLLC from the eNB (2j-10). Thereafter, the UE applies the BS computation method 1 until it receives an MAC CE indicative of packet duplication activation/deactivation and transmits/receives uplink/downlink data (2j-15). When the UE receives a Du A/D MAC CE, an MAC operation in the UE is changed. That is, from a viewpoint of the PDCP, this means that packet duplication transmission has been started/stopped, but from a viewpoint of the MAC, this means that the BS computation method needs to be updated (2j-20).

When the received Du A/D MAC CE indicates activation (based on a UE or RB, 2j-25), the UE switches to the BS computation method 2 for a corresponding DRB (or UE) (2j-30), triggers a regular BSR (2j-35), and performs data transmission/reception through a received grant (2j-40). In contrast, when the received Du A/D MAC CE indicates deactivation (based on a UE or RB, 2j-25), the UE switches to the BS computation method 1 for a corresponding DRB (or UE) (2j-45), and differently performs an operation based on an RLC mode (1k-50). In the case of an RLC UM DRB, the UE discards an RLC PDU and MAC SDU pre-processed in a non-preferred logical channel (2j-55). In the case of an RLC AM DRB, the UE transmits an RLC PDU and MAC SDU pre-processed in a non-preferred logical channel without any change or transmits a header-only packet other than payload (2j-60).

Figure 2K:
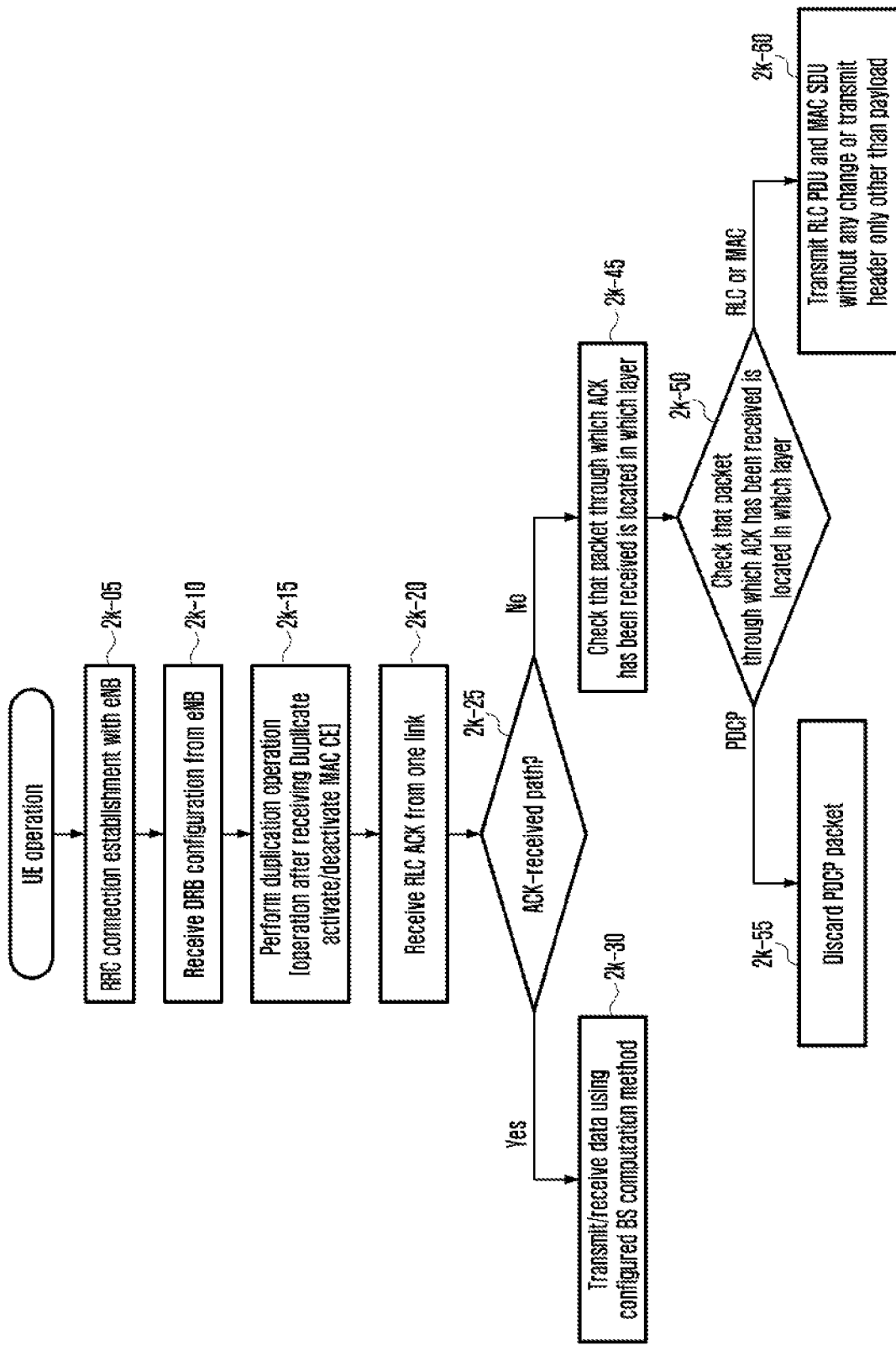
FIG. 2K is a diagram illustrating a UE operation when ACK is received from one link while a packet duplication UE operation is performed and the successful delivery of a packet-duplicated data packet is confirmed according to an embodiment of the present disclosure.

FIG. 2K is a diagram illustrating a UE operation when ACK is received from one link while a packet duplication UE operation is performed and the successful delivery of a packet-duplicated data packet is confirmed according to an embodiment of the present disclosure.

A UE establishes an RRC connection with an eNB for data transmission/reception (2k-05), and receives an RRC message including a bearer (DRB) configuration for URLLC from the eNB (2k-10). Thereafter, the UE performs the packet duplication operation described with reference to FIG. 2j (2k-15). If the successful transmission of a given packet (accurately, packets transmitted through different links due to the activation of packet duplication) is confirmed in one link due to RLC ACK while the packet duplication operation is performed (2k-20), the operation of the UE is defined. At operation 2k-25, the UE identifies that the received ACK corresponds to which link and continues to perform data transmission/reception by applying a BS computation method configured for the link through which the ACK has been received (2k-30). In contrast, the UE identifies that a packet corresponding to the SN of a packet in which the ACK has been received has been buffered in which layer with respect to a link through which the ACK has not been received (2k-45). If the corresponding packet has been buffered in the PDCP layer (2k-50), the UE discards a corresponding PDCP packet (2k-55). If the corresponding packet has been buffered in the RLC or the MAC layer, the UE may transmit a prepared RLC PDU and MAC SDU without any change or may transmit only a head other than payload (2k-60). The operation corresponds to a case where it is performed based on the RLC AM.

Figure 2L:
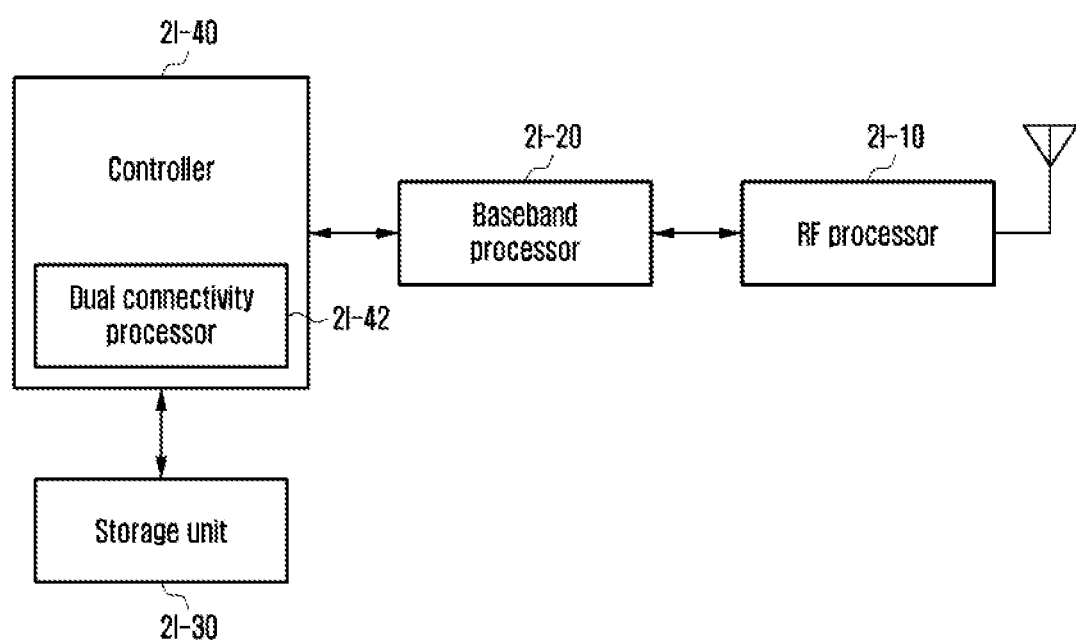
FIG. 2L is a diagram illustrating the configuration of a UE according to an embodiment of the present disclosure.

FIG. 2L is a diagram illustrating the configuration of a UE according to an embodiment of the present disclosure.

Referring to FIG. 2L, the UE includes a radio frequency (RF) processor 2l-10, a baseband processor 2l-20, a storage unit 2l-30, and a controller 2l-40.

The RF processor 2l-10 performs functions for transmitting/receiving a signal through a radio channel, such as the band conversion and amplification of a signal. That is, the RF processor 2l-10 up-converts a baseband signal received from the baseband processor 2l-20 into an RF band signal, transmits the RF band signal through an antenna, and down-converts an RF band signal received through the antenna into a baseband signal. For example, the RF processor 2l-10 may include a transmission filter, a reception filter, an amplifier, a mixer, an oscillator, a DAC, and an ADC. In FIG. 2L, only one antenna has been illustrated, but the UE may include multiple antennas. Furthermore, the RF processor 2l-10 may include multiple RF chains. Furthermore, the RF processor 2l-10 may perform beamforming. For the beamforming, the RF processor 2l-10 may adjust the phase and size of each of signals transmitted/received through multiple antennas or antenna elements. Furthermore, the RF processor may perform MIMO. When performing the MIMO operation, the RF processor may receive multiple layers.

The baseband processor 2l-20 performs a baseband signal and inter-bit stream conversion function based on the physical layer standard of a system. For example, when data is transmitted, the baseband processor 2l-20 generates complex symbols by coding and modulating a transmission bit stream. Furthermore, when data is received, the baseband processor 2l-20 reconstructs a received bit stream from a baseband signal received from the RF processor 2l-10 through modulation and demodulation. For example, if the OFDM scheme is applied, when data is transmitted, the baseband processor 2l-20 generates complex symbols by coding and modulating a transmission bit stream, maps the complex symbols to subcarriers, and then configures OFDM symbols through IFFT operation and CP insertion. Furthermore, when data is received, the baseband processor 2l-20 segments a baseband signal received from the RF processor 2l-10 in an OFDM symbol unit, reconstructs signals mapped to subcarriers through FFT operation, and reconstructs a received bit stream through modulation and demodulation.

The baseband processor 2l-20 and the RF processor 2l-10 transmit and receive signals as described above. Accordingly, the baseband processor 2l-20 and the RF processor 2l-10 may be called a transmitter, a receiver, a transceiver or a communication unit. Furthermore, at least one of the baseband processor 2l-20 and the RF processor 2l-10 may include multiple communication modules in order to support different multiple radio access technologies. Furthermore, at least one of the baseband processor 2l-20 and the RF processor 2l-10 may include different communication modules in order to process signals of different frequency bands.

For example, the different radio access technologies may include a wireless LAN (e.g., IEEE 802.11) and a cellular network (e.g., LTE). Furthermore, the different frequency bands may include a super high frequency (SHF) (e.g., 2.NRHz, NRhz) band and a millimeter wave (e.g., 60 GHz) band.

The storage unit 2*l*-30 stores a basic program for the operation of the UE, an application program, and data such as configuration information. Specifically, the storage unit 2*l*-30 may store information related to a second access node that performs wireless communication using a second radio access technology. Furthermore, the storage unit 2*l*-30 provides stored data in response to a request from the controller 2*l*-40.

The controller 2*l*-40 controls overall operations of the UE. For example, the controller 2*l*-40 transmits/receives a signal through the baseband processor 2*l*-20 and the RF processor 2*l*-10. Furthermore, the controller 2*l*-40 writes/reads data in/from the storage unit 2*l*-30. To this end, the controller 2*l*-40 may include at least one processor. For example, the controller 2*l*-40 may include a communication processor (CP) performing control for communication and an application processor (AP) controlling a higher layer, such as an application program.

Furthermore, the controller 2*l*-40 may control to receive packet duplication data radio bearer (DRB) configuration information from an eNB, to receive a MAC CE including information indicating whether packet duplication has been activated from the eNB, and to determine whether to activate a packet duplication bearer based on the packet duplication DRB configuration information and the MAC CE. The information indicating whether packet duplication has been activated includes bitmap information. The bitmap information may correspond to the sequence of packet duplication bearer identifiers configured by the packet duplication DRB configuration information.

Furthermore, when the MAC CE indicates packet duplication deactivation and the transmission mode of the UE is an RLC AM, the controller 2*l*-40 may control to transmit an RLC PDU or MAC PDU in which the packet duplication deactivation indication has been received and which is stored in the buffer of a bearer.

Furthermore, the controller 2*l*-40 identifies the successful transmission of a packet in a link set up through a CA or DC. When the MAC CE indicates packet duplication deactivation, the controller 2*l*-40 may control to discard a duplication packet corresponding to the packet if the duplication packet has not been transmitted from the PDCP layer to the RLC layer and to transmit the duplication packet if the duplication packet has been transmitted from the PDCP layer to the RLC layer.

Furthermore, the controller 2*l*-40 may control to start the LCP operation of the LC of the packet duplication bearer after the MAC CE is received.

Figure 2M:
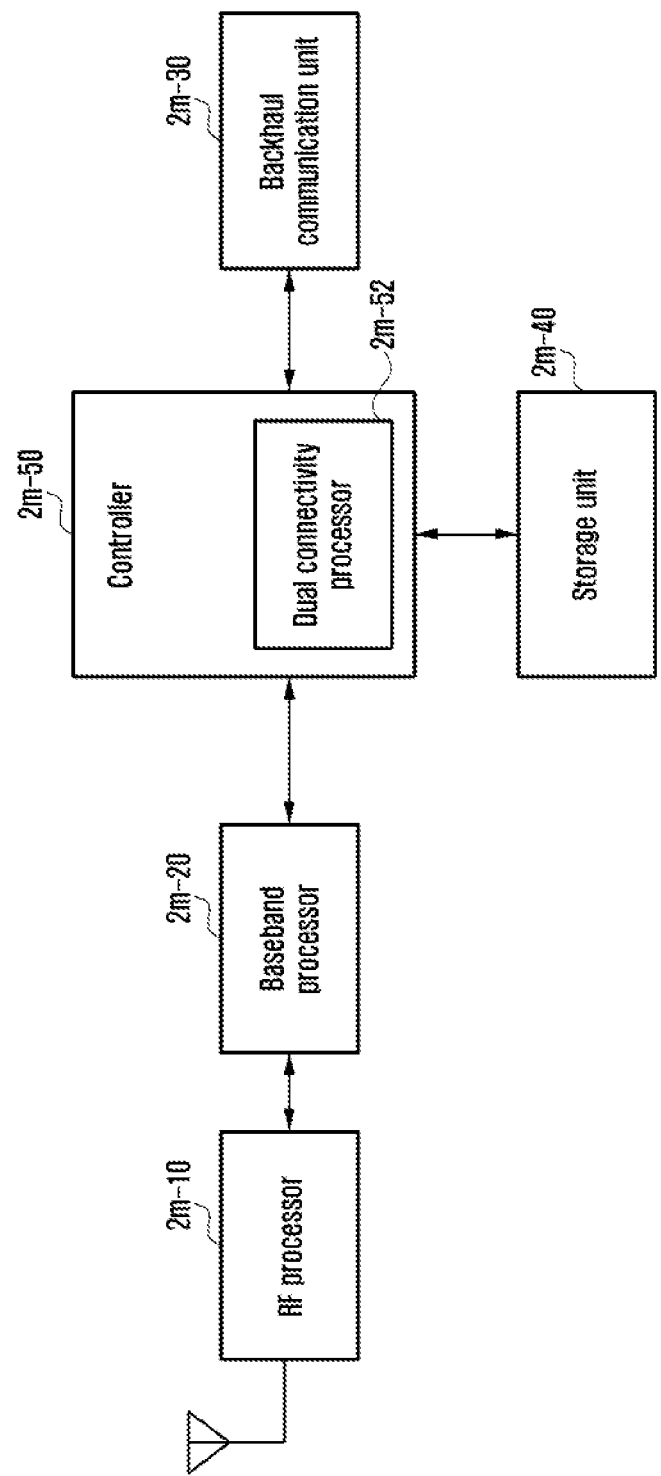
FIG. 2M is a diagram illustrating the configuration of an eNB according to an embodiment of the present disclosure.

FIG. 2M is a diagram illustrating the configuration of an eNB according to an embodiment of the present disclosure.

As shown in FIG. 2M, the eNB includes an RF processor 2*m*-10, a baseband processor 2*m*-20, a backhaul communication unit 2*m*-30, a storage unit 2*m*-40, and a controller 2*m*-50.

The RF processor 2*m*-10 performs functions for transmitting/receiving a signal through a radio channel, such as the band conversion and amplification of a signal. That is, the RF processor 2*m*-10 up-converts a baseband signal received from the baseband processor 2*m*-20 into an RF band signal, transmits the RF band signal through an antenna, and down-converts an RF band signal received through the antenna into a baseband signal. For example, the RF processor 2*m*-10 may include a transmission filter, a reception filter, an amplifier, a mixer, an oscillator, a DAC, and an ADC. In FIG. 2M, only one antenna has been illustrated, but the UE may include multiple antennas. Furthermore, the RF processor 2*m*-10 may include multiple RF chains. Furthermore, the RF processor 2*m*-10 may perform beamforming. For the beamforming, the RF processor 2*m*-10 may adjust the phase and size of each of signals transmitted/received through multiple antennas or antenna elements. The RF processor may perform a downlink MIMO operation by transmitting one or more layers.

The baseband processor 2*m*-20 performs a baseband signal and inter-bit stream conversion function based on the physical layer standard of a first radio access technology. For example, when data is transmitted, the baseband processor 2*m*-20 generates complex symbols by coding and modulating a transmission bit stream. Furthermore, when data is received, the baseband processor 2*m*-20 reconstructs a received bit stream from a baseband signal received from the RF processor 2*m*-10 through modulation and demodulation. For example, if the OFDM scheme is applied, when data is transmitted, the baseband processor 2*m*-20 generates complex symbols by coding and modulating a transmission bit stream, maps the complex symbols to subcarriers, and then configures OFDM symbols through IFFT operation and CP insertion. Furthermore, when data is received, the baseband processor 2*m*-20 segments a baseband signal received from the RF processor 2*m*-10 in an OFDM symbol unit, reconstructs signals mapped to subcarriers through FFT operation, and reconstructs a received bit stream through modulation and demodulation. The baseband processor 2*m*-20 and the RF processor 2*m*-10, as described above, transmits and receives signals. Accordingly, the baseband processor 2*m*-20 and the RF processor 2*m*-10 may be called a transmitter, a receiver, a transceiver, a communication unit or a wireless communication unit.

The backhaul communication unit 2*m*-30 provides an interface for performing communication with other nodes within a network. That is, the backhaul communication unit 2*m*-30 converts a bit stream, transmitted from the primary eNB to a different node, for example, a secondary eNB or a core network, into a physical signal, and converts a physical signal received from the different node into a bit stream.

The storage unit 2*m*-40 stores data, such as a basic program for the operation of the primary eNB, an application program, and configuration information. Specifically, the storage unit 2*m*-40 may store information on a bearer allocated to an accessed UE and measurement results reported by an accessed UE. Furthermore, the storage unit 2*m*-40 may store information, that is, a criterion by which whether to provide a UE with dual connectivity or to stop dual connectivity is determined. Furthermore, the storage unit 2*m*-40 provides stored data in response to a request from the controller 2*m*-50.

The controller 2*m*-50 controls overall operations of the primary eNB. For example, the controller 2*m*-50 transmits/receives a signal through the baseband processor 2*m*-20 and the RF processor 2*m*-10 or through the backhaul communication unit 2*m*-30. Furthermore, the controller 2*m*-50 writes/reads data in/from the storage unit 2*m*-40. To this end, the controller 2*m*-50 may include at least one processor.

Furthermore, the controller 2*m*-50 may control to transmit packet duplication DRB configuration information to a UE and to transmit a MAC CE including information indicating whether packet duplication has been activated to the UE. Whether to activate a packet duplication bearer may be determined based on the packet duplication DRB configuration information and the MAC CE. Furthermore, the information indicating whether packet duplication has been activated includes bitmap information. The bitmap information may correspond to the sequence of packet duplication bearer identifiers configured by the packet duplication DRB configuration information.

When the MAC CE indicates packet duplication deactivation and the transmission mode of the UE is an RLC AM, the eNB may receive an RLC PDU or MAC PDU stored in the buffer of a bearer in which the packet duplication deactivation indication has been received. When the successful transmission of a packet is identified in a link set up through a CA or DC and the MAC CE indicates packet duplication deactivation, a duplication packet corresponding to the packet may be discarded if the duplication packet has not been transmitted from the PDCP layer to the RLC layer, and the duplication packet may be transmitted to the UE if the duplication packet has been transmitted from the PDCP layer to the RLC layer. The LCP operation of the LC of the packet duplication bearer may be started after the UE receives the MAC CE.

Another embodiment of the present disclosure relates to a method and apparatus for processing a packet duplication transmission failure in a next-generation mobile communication system.

Figure 3A:
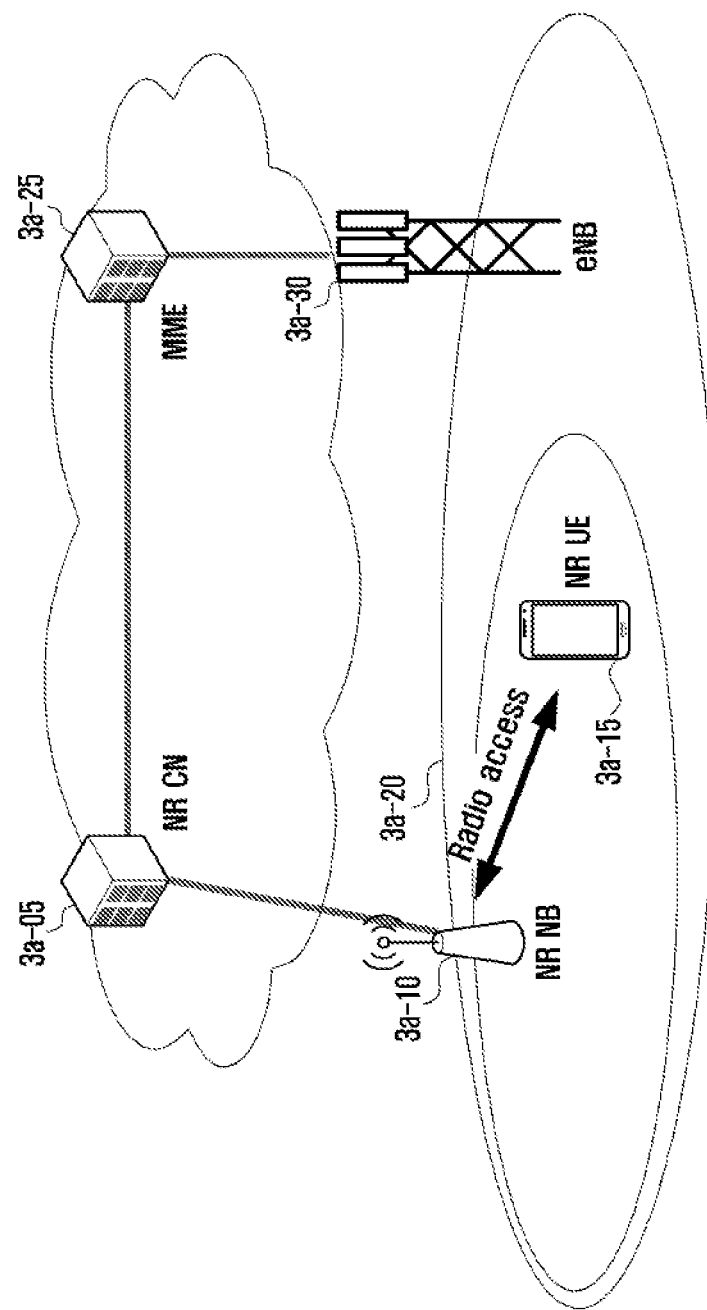
FIG. 3A is a diagram illustrating the configuration of a next-generation mobile communication system according to an embodiment of the present disclosure.

FIG. 3A is a diagram illustrating the configuration of a next-generation mobile communication system according to an embodiment of the present disclosure.

Referring to FIG. 3A, the radio access network of the next-generation mobile communication system includes a new radio Node B (hereinafter referred to as an "NR NB") 3a-10 and a new radio core network (NR CN) 3a-05. A new radio user equipment (hereinafter referred to as an "NR UE" or an "NR terminal") 3a-15 accesses an external network through the NR NB 3a-10 and the NR CN 3a-05.

In FIG. 3A, the NR NB 3a-10 corresponds to an eNB of the existing LTE system. The NR NB 3a-10 is connected to the NR UE 3a-15 through a radio channel, and may provide excellent services compared to the existing Node B. The next-generation mobile communication system requires a device for performing scheduling by collecting state information, such as the buffer state, available transmission power state, and channel state of UEs, because all of types of user traffic are served through a shared channel. The NR NB 3a-10 is in charge of the device. In general, one NR NB controls multiple cells. In order to implement super-high speed data transmission compared to the existing LTE, the next-generation mobile communication system may have the existing maximum bandwidth or more and may additionally graft the beamforming technology using OFDM as a radio access technology. Furthermore, the next-generation mobile communication system adopts the AMC scheme that determines a modulation scheme and a channel coding rate based on the channel state of a UE. The NR CN 3a-05 performs functions, such as mobility support, a bearer configuration, and a QoS configuration. The NR CN 3a-05 is in charge of various control functions in addition to a mobility management function for a UE, and is connected to multiple eNBs. Furthermore, the next-generation mobile communication system may also operate in conjunction with the existing LTE system. The NR CN 3a-05 is connected to an MME 3a-25 through a network interface. The MME 3a-25 is connected to an eNB 3a-30, that is, the existing eNB.

Figure 3B:
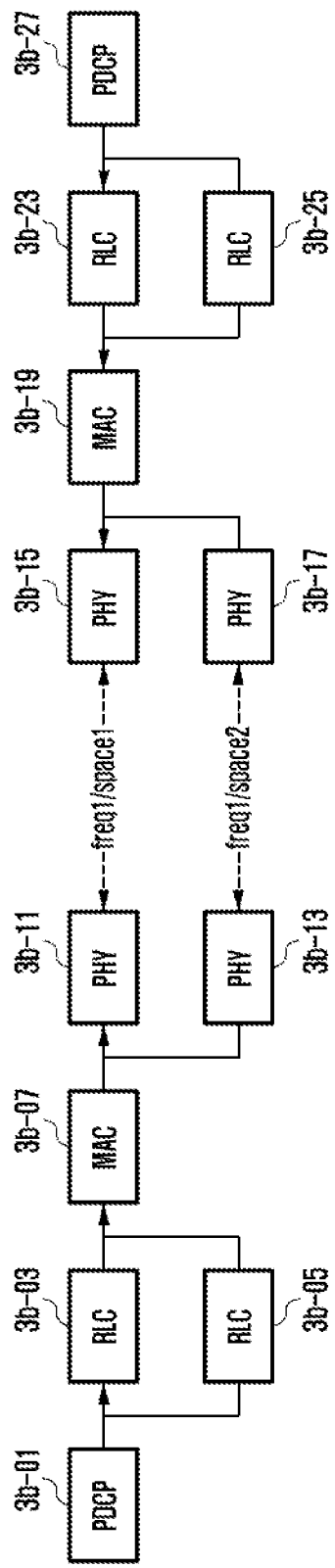
FIG. 3B is a diagram illustrating the protocol structures of a transmission stage and reception stage for high reliability low-latency communication with respect to a given traffic type/radio bearer according to an embodiment of the present disclosure.

FIG. 3B is a diagram illustrating the protocol structures of a transmission stage and reception stage for high reliability low-latency communication with respect to a given traffic type/radio bearer according to an embodiment of the present disclosure. FIG. 3B corresponds a method for a PDCP layer 3b-01 to generate a duplication packet having the same SN with respect to the same packet of a given traffic type/radio bearer and to transmit the duplication packet to independent RLC layers 3b-03 and 3b-05, but to transmit the duplication packet through a shared MAC layer 3b-07. In this case, the PDCP layer separately manages SNs in the RLC layers by transmitting the same packet to the different RLC layers. The MAC layer 3b-07 transmits the packets, received from the respective RLC layers, to the same physical layer or different physical layers 3b-11 and 3b-13. The physical layers 3b-15 and 3b-17 that have received the packets transmit the packets to a corresponding MAC layer 3b-19. The packets are transmitted to respective corresponding RLC layers 3b-23 and 3b-25 and are finally transmitted to a PDCP layer 3b-27. If all of packets having a duplicated SN are transmitted through different paths successfully and arrive at the PDCP layer 3b-27, a duplicated packet is discarded and only one packet is transmitted to a higher layer on the reception side. Furthermore, it is assumed that the RLC layer is an entity that operates according to an unacknowledged mode (UM) method not having retransmission through an automatic repeat request (ARQ) for low latency communication. Furthermore, the different physical layers may be resources that are spatially different using different frequencies or the same frequency or different antennas.

Figure 3C:
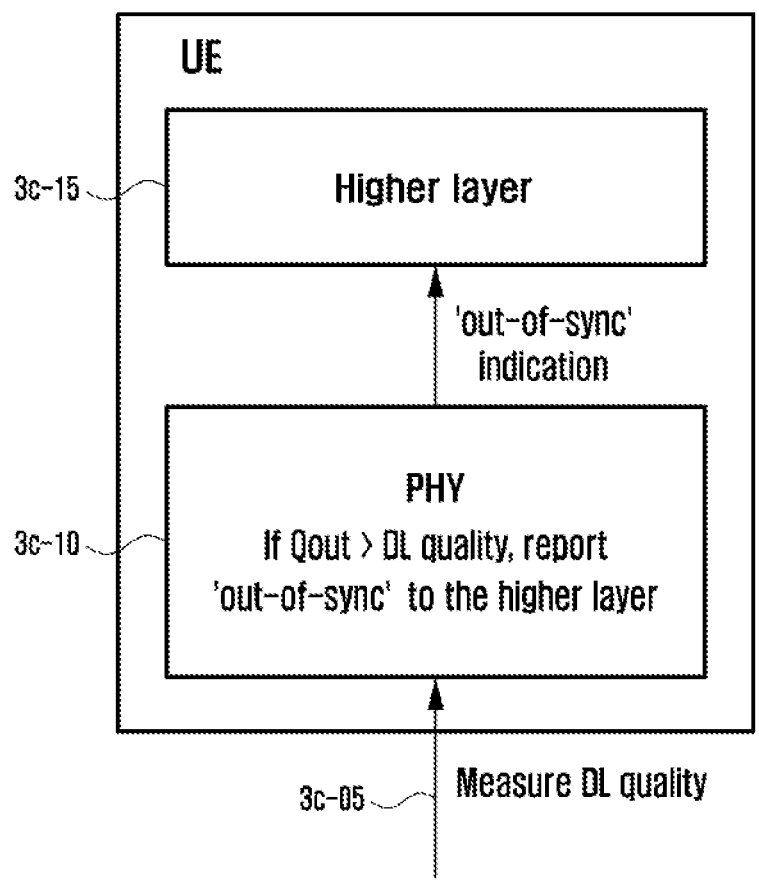
FIG. 3C is a diagram for illustrating a radio link monitoring (RLM) operation in the LTE technology according to an embodiment of the present disclosure.

FIG. 3C is a diagram for illustrating a radio link monitoring (RLM) operation in the LTE technology according to an embodiment of the present disclosure.

The physical layer (PHY) of a UE measures downlink signal quality from the cell-specific reference (CRS) signal of a serving cell (3c-05). The physical layer determines whether the signal quality is lower than a given threshold Qout (3c-10). The threshold is a signal quality value corresponding to a given BLER measured in a PDCCH. If the signal quality is lower than the given threshold Qout, the physical layer transmits an "out-of-sync" indicator to a higher layer. In the LTE technology, the operation is called RLM. When the indicator of a given number or more is transmitted to the higher layer, the higher layer drives a given timer. When the timer expires, the higher layer declares a radio link failure (RLF) (3c-15).

FIG. 3D is a diagram for illustrating an RLF operation in the LTE technology according to an embodiment of the present disclosure.

As described above, the RLF may be declared based on a result from RLM. The physical layer of a UE determines whether downlink signal quality is lower than a given threshold Qout based on the CRS of a serving cell at a given cycle or every Qout evaluation period. If the signal quality is lower than the given threshold Qout, the physical layer transmits an "out-of-sync" indicator to the higher layer. After a minimum indicator is transmitted to the higher layer (3d-05), when the minimum indicator is transmitted to the higher layer by a given number N310, a given timer T310 is driven (3d-10). The physical layer determines whether the downlink signal quality is higher than a given threshold Qin based on the CRS of the serving cell. If the signal quality is higher than the given threshold Qin, the physical layer transmits an "in-sync" indicator to the higher layer. When the indicator is transmitted to the higher layer by a given number, the driving timer T310 is stopped. If the timer T310 is not stopped and expires, the higher layer declares an RLF (3d-15). After declares the RLF, the UE drives another timer T311. The UE discovers a new suitable cell. If the UE does not discover a suitable cell until the timer T311 expires, the UE switches to an idle mode (3d-25). If the UE discovers a new suitable cell before the timer expires, it drives a timer T301 timer and performs a re-establishment process on the new cell (3d-20). If the re-establishment is not successfully completed until the timer T301 timer expires, the UE switches to the idle mode (3d-30). When the re-establishment is successful, the UE continues to maintain a connection mode for the cell. An RLF may be declared by an RLM operation or may be declared under another condition. An RLF may be declared when random access fails (3d-35). Furthermore, although a maximum retransmission number is reached in the RLC layer, if a packet is not successfully transmitted, an RLF is declared (3d-40).

An embodiment of the present disclosure proposes a scheme for declaring an RLF based on the RLC problem in the aforementioned packet duplication transmission technology.

In the carrier aggregation technology, one RLC layer is present within a UE. Accordingly, the aforementioned operation is applied. In contrast, in the dual connectivity technology, two RLC layers are present in a UE. One RLC layer processes a packet related to a MeNB, and the other RLC layer processes a packet related to an SeNB. An MCG RLC corresponding to the MeNB determines whether an RLF condition is satisfied, and declares an RLF when the RLF condition is satisfied. An SCG RLC corresponding to the SeNB determines whether the RLF condition is satisfied, and resets an SCG failure information process without declaring an RLF when the RLF condition is satisfied. The process is to report to the MeNB that a problem has occurred in a PSCell.

The packet duplication transmission technology is based on the carrier aggregation technology, but is different from the carrier aggregation technology in that two RLC layers are present. Accordingly, a new RLF declaration rule may be necessary.

Figure 3E:
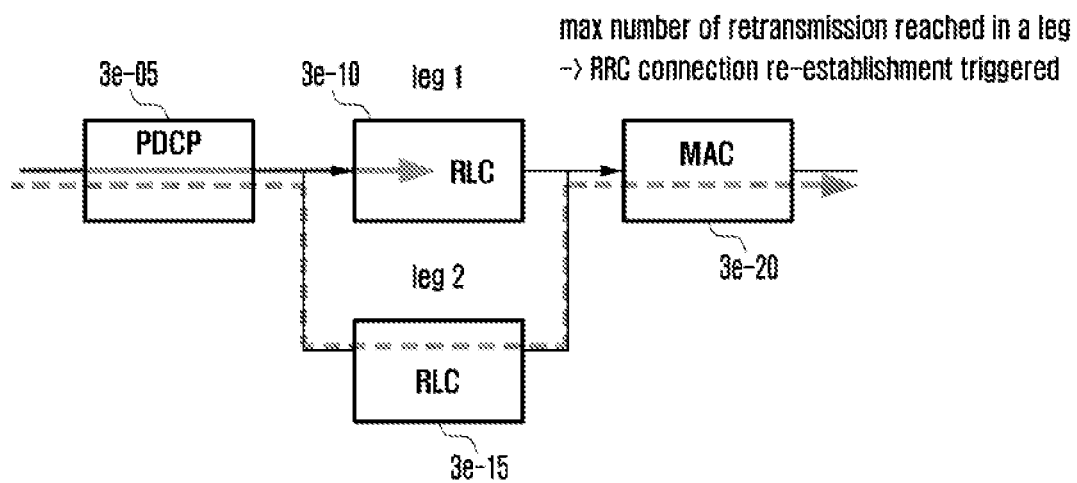
FIG. 3E is a diagram illustrating a first scheme for processing an RLC problem when a packet is duplicated and transmitted in a next-generation mobile communication system according to an embodiment of the present disclosure.

FIG. 3E is a diagram illustrating a first scheme for processing an RLC problem when a packet is duplicated and transmitted in a next-generation mobile communication system according to an embodiment of the present disclosure.

In the first scheme, when maximum retransmission occurs in one of two RLC layers, a UE declares an RLF, and performs an RRC connection re-establishment process on a newly discovered suitable cell. The PDCP layer 3e-05 transmits a duplicated same packet to the two RLC layers 3e-10 and 3e-15. The RLC layers 3e-10 and 3e-15 process the same packet and transmits them to one MAC layer 3e-20. At this time, when maximum retransmission occurs in one (3e-10) of the two RLC layers, the UE declares an RLF. When the RLF is declared, the other RLC layer 3e-15 that has not performed maximum retransmission stops the packet processing.

In the first scheme, to perform RRC connection re-establishment may be an over-reaction because another RLC layer can still transmits/receives a packet successfully.

Figure 3F:
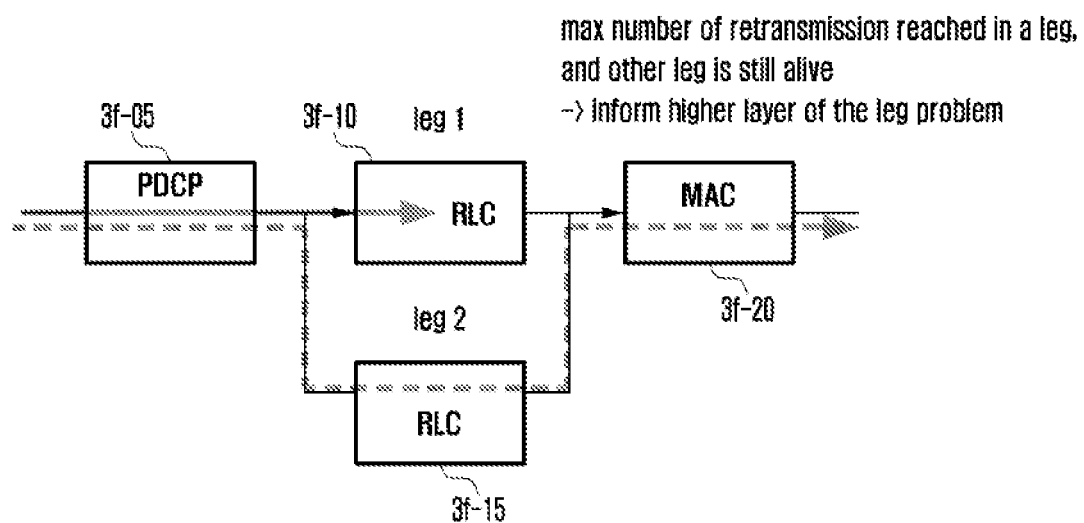
FIG. 3F is a diagram illustrating a second scheme for processing an RLC problem when a packet is duplicated and transmitted in a next-generation mobile communication system according to an embodiment of the present disclosure.

FIG. 3F is a diagram illustrating a second scheme for processing an RLC problem when a packet is duplicated and transmitted in a next-generation mobile communication system according to an embodiment of the present disclosure.

In the second scheme, when maximum retransmission occurs in both RLC layers, a UE declares an RLF and performs an RRC connection re-establishment process on a newly discovered suitable cell. However, when maximum retransmission occurs only in one RLC layer, the UE does not declare an RLF and reports the problem to a higher layer. Furthermore, when the maximum retransmission occurs, the RLC layer operation may be divided into two options.

Option 1) an RLC layer in which maximum retransmission has occurred reports that maximum retransmission has occurred to a higher layer, suspends packet processing, and waits for a new configuration from the higher layer.

Option 2) An RLC layer in which maximum retransmission has occurred reports that maximum retransmission has occurred to a higher layer and continues to perform packet processing. Detailed methods for continuing to perform the packet processing are described below.

Method 1: deletes a packet for which maximum retransmission has occurred, resets a full counted retransmission number, restarts a retransmission number, and performs next packet transmission.

Method 2: resets a full counted retransmission number, restarts a retransmission number, and continue to perform the retransmission of a processing packet. When the restarted retransmission number reaches a maximum retransmission number, an RLC layer reports it to a higher layer again. The retransmission may continue until a given number of reports occur, until indication is received from a higher layer or the other RLC layer, or until a packet duplication configuration is released. The given number may be previously set or set through dedicated RRC signaling from a network. The network may configure maximum retransmission number information indicating that an RLC problem has occurred by dividing it into an object of declaring an RLF and an object of reporting an RLC problem to a higher layer. The configuration is transmitted to a UE through dedicated RRC signaling.

A PDCP layer 3f-05 transmits a duplicated same packet to two RLC layers 3f-10 and 3f-15. Each of the RLC layers 3f-10 and 3f-15 processes the same packet and transmits it to one MAC layer 3f-20. At this time, when maximum retransmission occurs in one of the two RLC layers, the RLC 3f-10 in which the maximum retransmission has occurred, for example, performs one of the two options. The RLC 3f-15 in which the maximum retransmission has not occurred, for example, continues to perform packet processing.

Figure 3G:
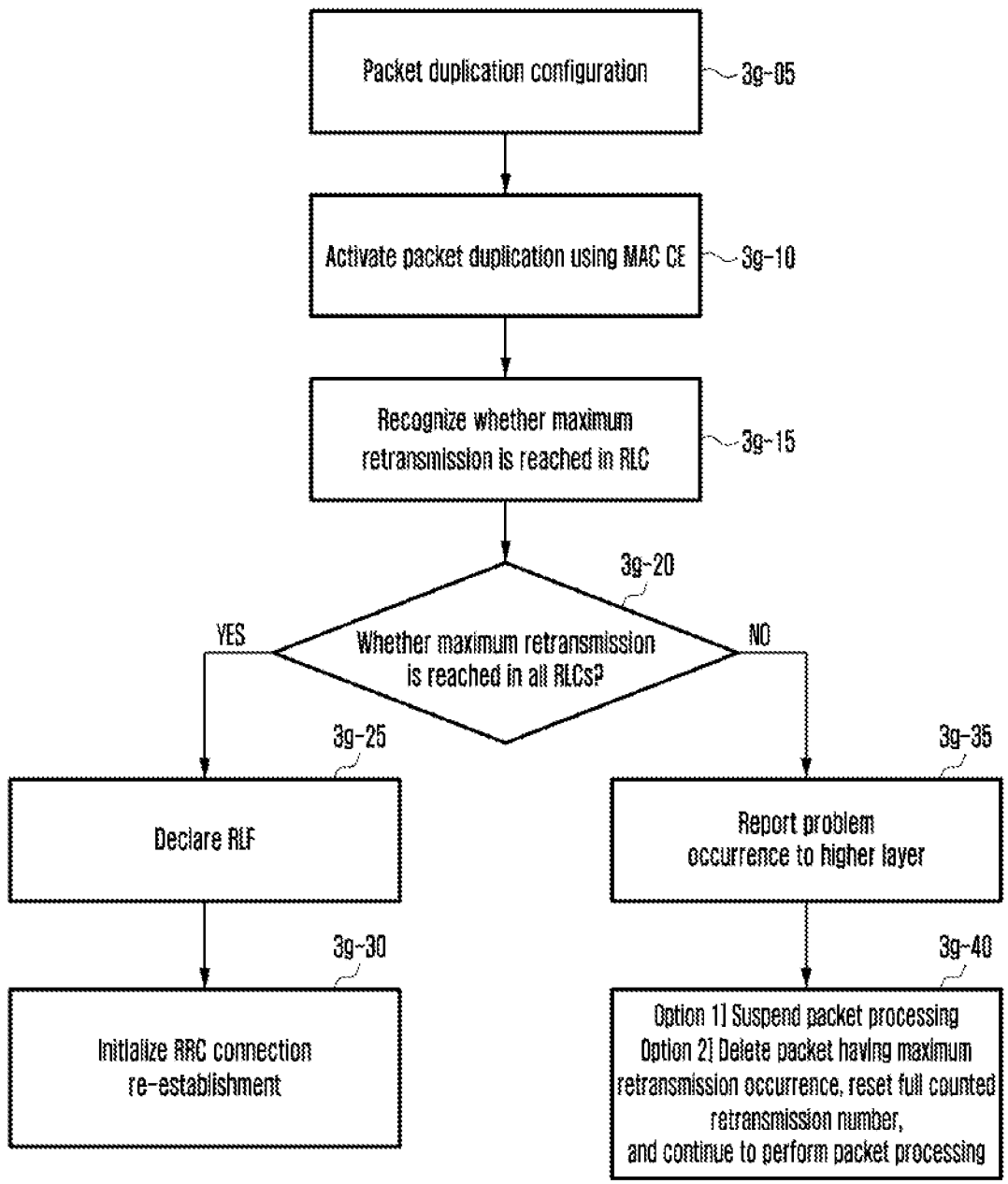
FIG. 3G is a diagram illustrating an operation of a UE to process an RLC problem when a packet is duplicated and transmitted in a next-generation mobile communication system according to an embodiment of the present disclosure.

FIG. 3G is a diagram illustrating an operation of a UE to process an RLC problem when a packet is duplicated and transmitted in a next-generation mobile communication system according to an embodiment of the present disclosure.

At operation 3g-05, a UE applies configuration information for packet duplication transmission received from an eNB. At operation 3g-10, the UE receives an MAC CE for activating the packet duplication transmission from the eNB and then triggers the packet duplication transmission. At operation 3g-15, the UE recognizes that maximum retransmission has occurred in the RLC layer. At operation 3g-20, the UE determines whether the maximum retransmission has occurred in all of RLC layers or the maximum retransmission has occurred in one RLC layer only. If the maximum retransmission has occurred in all of the RLC layers, the UE declares an RLF at operation 3g-25 and initializes an RRC connection re-establishment operation at operation 3g-30. If the maximum retransmission has occurred in one RLC only, the UE reports that a problem has occurred to a higher layer at operation 3g-35. The higher layer means the RRC layer. At operation 3g-40, the UE performs one of the following operations.

Option 1) an RLC layer in which maximum retransmission has occurred suspends packet processing and waits for a new configuration from a higher layer.

Option 2) an RLC layer in which maximum retransmission has occurred continues to perform packet processing.

For example, the UE may perform the following operation based on a result of the determination at operation 3g-20. If the condition of operation 3g-20 is satisfied only in an SCG RLC layer corresponding to an SeNB, the UE does not declare an RLF, but may report the occurrence of a problem to a higher layer at operation 3g-35. If it is determined that a maximum retransmission number has be reached in all the RLCs of the UE at operation 3g-20, the condition of the maximum retransmission number is satisfied even in the RLC of an MCG corresponding to an MeNB. The UE may declare an RLF at operation 3g-25.

Figure 3H:
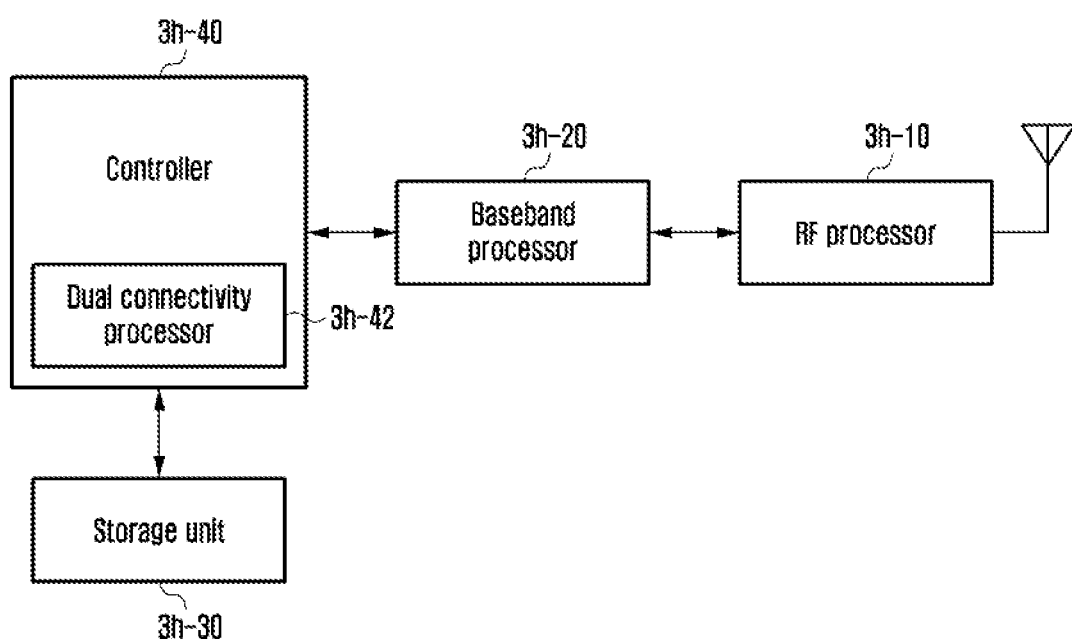
FIG. 3H is a diagram illustrating the configuration of a UE according to an embodiment of the present disclosure.
Figure 31:
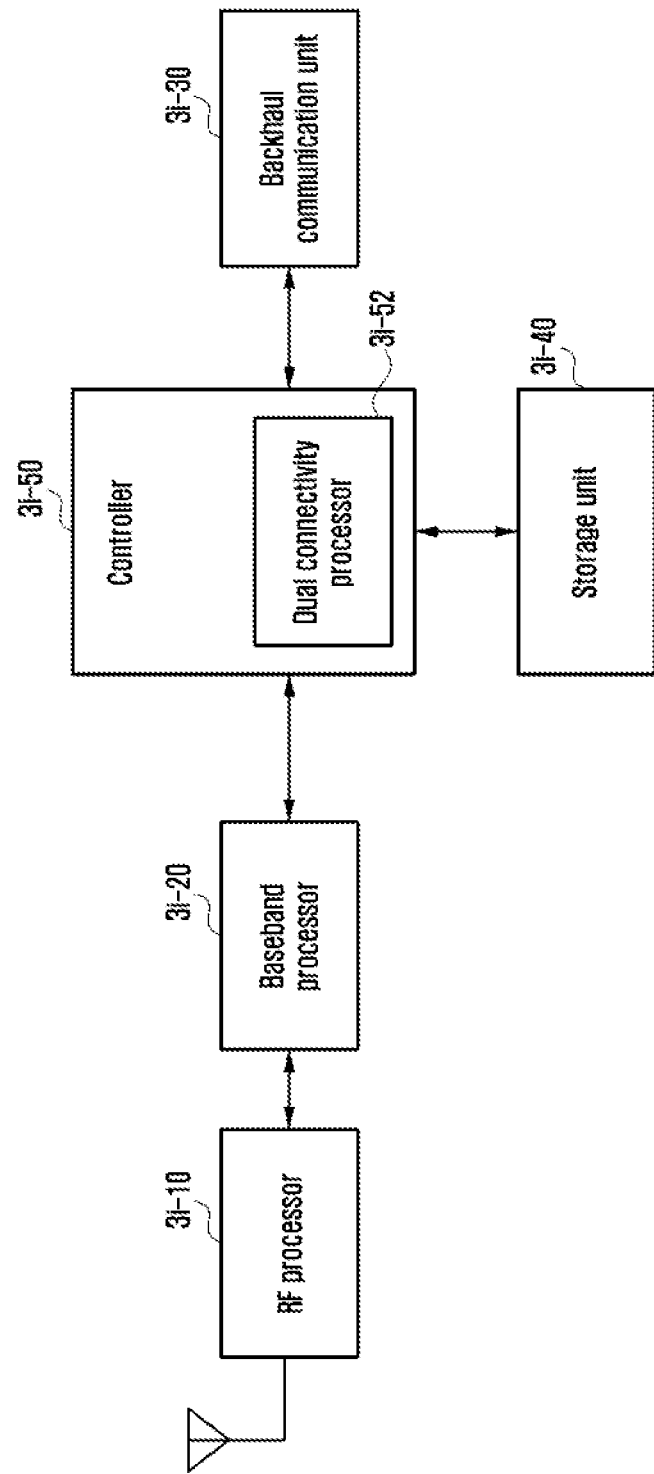

FIG. 3H is a diagram illustrating the configuration of a UE according to an embodiment of the present disclosure.

Referring to FIG. 3H, the UE includes a radio frequency (RF) processor 3h-10, a baseband processor 3h-20, a storage unit 3h-30, and a controller 3h-40.

The RF processor 3h-10 performs a function for transmitting/receiving a signal through a radio channel, such as the band conversion and amplification of a signal. That is, the RF processor 3h-10 up-converts a baseband signal received from the baseband processor 3h-20 into an RF band signal, transmits the RF band signal through an antenna, and down-converts an RF band signal received through the antenna into a baseband signal. For example, the RF processor 3h-10 may include a transmission filter, a reception filter, an amplifier, a mixer, an oscillator, a DAC, and an ADC. In FIG. 3H, only one antenna has been illustrated, but the eNB may include multiple antennas. Furthermore, the RF processor 3h-10 may include multiple RF chains. Furthermore, the RF processor 3h-10 may perform beamforming. For the beamforming, the RF processor 3h-10 may adjust the phase and size of each of signals transmitted/received multiple antennas or antenna elements. Furthermore, the RF processor may perform MIMO and may receive multiple layers when performing an MIMO operation.

The baseband processor 3h-20 performs a baseband signal and inter-bit stream conversion function based on the physical layer standard of a system. For example, when data is transmitted, the baseband processor 3h-20 generates complex symbols by coding and modulating a transmission bit stream. Furthermore, when data is received, the baseband processor 3h-20 reconstructs a received bit stream from a baseband signal received from the RF processor 3h-10 through modulation and demodulation. For example, if the OFDM scheme is applied, when data is transmitted, the baseband processor 3h-20 generates complex symbols by coding and modulating a transmission bit stream, maps the complex symbols to subcarriers, and configures OFDM symbols through IFFT operation and CP insertion. Furthermore, when data is received, the baseband processor 3h-20 segments a baseband signal received from the RF processor 3h-10 in an OFDM symbol unit, reconstructs signals mapped to subcarriers through FFT operation, and then reconstructs a received bit stream through modulation and demodulation.

The baseband processor 3h-20 and the RF processor 3h-10 transmit and receive signals as described above. Accordingly, the baseband processor 3h-20 and the RF processor 3h-10 may be called a transmitter, a receiver, a transceiver, a communication unit or a wireless communication unit. Furthermore, at least one of the baseband processor 3h-20 and the RF processor 3h-10 may include multiple communication modules in order to support different multiple radio access technologies. Furthermore, at least one of the baseband processor 3h-20 and the RF processor 3h-10 may include different communication modules in order to process signals of different frequency bands. For example, the different radio access technologies may include a wireless LAN (e.g., IEEE 802.11) and a cellular network (e.g., LTE). Furthermore, the different frequency bands may include a super high frequency (SHF) (e.g., 2.NRHz, NRhz) band and a millimeter wave (e.g., 60 GHz) band.

The storage unit 3h-30 stores a basic program for the operation of the UE, an application program, and data such as configuration information. Specifically, the storage unit 3h-30 may store information related to a second access node that performs wireless communication using a second radio access technology. Furthermore, the storage unit 3h-30 provides stored data in response to a request from the controller 3h-40.

The controller 3h-40 controls overall operations of the UE. For example, the controller 3h-40 transmits/receives a signal through the baseband processor 3h-20 and the RF processor 3h-10. Furthermore, the controller 3h-40 writes/reads data in/from the storage unit 3h-30. To this end, the controller 3h-40 may include at least one processor. For example, the controller 3h-40 may include a communication processor (CP) performing control for communication and an application processor (AP) controlling a higher layer, such as an application program.

FIG. 3I is a diagram illustrating the configuration of an eNB according to an embodiment of the present disclosure.

As shown in FIG. 3I, the eNB includes an RF processor 3i-10, a baseband processor 3i-20, a backhaul communication unit 3i-30, a storage unit 3i-40, and a controller 3i-50.

The RF processor 3i-10 performs a function for transmitting/receiving a signal through a radio channel, such as the band conversion and amplification of a signal. That is, the RF processor 3i-10 up-converts a baseband signal received from the baseband processor 3i-20 into an RF band signal, transmits the RF band signal through an antenna, and down-converts an RF band signal received through the antenna into a baseband signal. For example, the RF processor 3i-10 may include a transmission filter, a reception filter, an amplifier, a mixer, an oscillator, a DAC, and an ADC. In FIG. 3I, only one antenna has been illustrated, but the first access node may include multiple antennas. Furthermore, the RF processor 3i-10 may include multiple RF chains. Furthermore, the RF processor 3i-10 may perform beamforming. For the beamforming, the RF processor 3i-10 may adjust the phase and size of each of signals transmitted/received multiple antennas or antenna elements. The RF processor may perform a downlink MIMO operation by transmitting one or more layers.

The baseband processor 3i-20 performs a baseband signal and inter-bit stream conversion function based on the physical layer standard of a first radio access technology. For example, when data is transmitted, the baseband processor 3i-20 generates complex symbols by coding and modulating a transmission bit stream. Furthermore, when data is received, the baseband processor 3i-20 reconstructs a received bit stream from a baseband signal received from the RF processor 3i-10 through modulation and demodulation. For example, if the OFDM scheme is applied, when data is transmitted, the baseband processor 3i-20 generates complex symbols by coding and modulating a transmission bit stream, maps the complex symbols to subcarriers, and configures OFDM symbols through IFFT operation and CP insertion. Furthermore, when data is received, the baseband processor 3i-20 segments a baseband signal received from the RF processor 3i-10 in an OFDM symbol unit, reconstructs signals mapped to subcarriers through FFT operation, and then reconstructs a received bit stream through modulation and demodulation. The baseband processor 3i-20 and the RF processor 3i-10 transmit and receive signals as described above. Accordingly, the baseband processor 3i-20 and the RF processor 3i-10 may be called a transmitter, a receiver, a transceiver, a communication unit or a wireless communication unit.

The backhaul communication unit 3i-30 provides an interface for performing communication with other nodes within a network. That is, the backhaul communication unit 3i-30 converts a bit stream, transmitted from the primary eNB to a different node, for example, a secondary eNB or a core network, into a physical signal, and converts a physical signal received from the different node into a bit stream.

The storage unit 3i-40 stores data, such as a basic program for the operation of the primary eNB, an application program, and configuration information. Specifically, the storage unit 3i-40 may store information on a bearer allocated to an accessed UE and measurement results reported by an accessed UE. Furthermore, the storage unit 3i-40 may store information, that is, a criterion by which whether to provide a UE with dual connectivity or to stop dual connectivity is determined. Furthermore, the storage unit 3i-40 provides stored data in response to a request from the controller 3i-50.

The controller 3i-50 controls overall operations of the primary eNB. For example, the controller 3i-50 transmits/receives a signal through the baseband processor 3i-20 and the RF processor 3i-10 or through the backhaul communication unit 3i-30. Furthermore, the controller 3i-50 writes data in the storage unit 3i-40 and reads data from the storage unit 3i-40. Specifically, in relation to the present disclosure, the controller 3i-50 writes/reads a COUNT value in/from the storage unit 3i-40. To this end, the controller 3i-50 may include at least one processor.

In accordance with the embodiments of the present disclosure, the method for a UE and an eNB to perform a COUNT CHECK operation in a next-generation mobile communication system, specifically, the operation of the UE is clearly defined. Accordingly, a PDCP COUNT operation can be accurately performed because a COUNT CHECK operation through each of the signaling radio bearer (SRB) 1 and the SRB3 and an operation for a corresponding SRB upon packet data convergence protocol (PDCP) reordering are accurately performed.

Furthermore, in accordance with the embodiments of the present disclosure, the operations of a UE and an eNB through packet duplication can be clarified by defining a method of transmitting newly introduced packet-duplicated data in a next-generation mobile communication system, specifically, when a packet duplication activation/deactivation MAC CE is received.

Furthermore, in accordance with the embodiments of the present disclosure, the method and apparatus for processing a packet duplication transmission failure in a next-generation mobile communication system can be provided.

Furthermore, various embodiments of the present disclosure disclosed in the specification and drawings propose only specific examples in order to easily describe the contents of the present disclosure and help understanding of the present disclosure, and are not intended to restrict the scope of the present disclosure. Accordingly, all of modifications or variations derived based on the technical spirit of the present disclosure should be construed as being included in the scope of the present disclosure in addition to the disclosed embodiments.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
configuring one or more data radio bearers (DRBs) for duplication through a radio resource control (RRC) message from a base station;
receiving, from the base station, a medium access control (MAC) control element (CE) including bitmap information, the bitmap information indicating whether to activate or deactivate a duplication of at least one DRB;
activating or deactivating the duplication of the at least one DRB among the one or more DRBs based on bits included in the bitmap information for the duplication configured based on the RRC message; and
in case that the MAC CE indicates a deactivation of the duplication of the at least one DRB, the terminal receives a negative acknowledgement (NACK) for a radio link control (RLC) protocol data unit (PDU) or an MAC PDU stored in a buffer of the at least one DRB in which the deactivation of the duplication is indicated, and a transmission mode for the at least one DRB is an RLC acknowledged mode (AM), transmitting the RLC PDU or the MAC PDU,
wherein the bitmap information consists of one byte field, and
wherein each bit included in the one byte field is mapped to an identifier of the at least one DRB for the duplication.

2. The method of claim 1, further comprising:
in case that a successful transmission of a packet is identified in a link configured through a carrier aggregation (CA) or dual connectivity (DC) and the MAC CE indicates the deactivation of the duplication, discarding a duplicated packet corresponding to the packet.

3. The method of claim 1, wherein the bits included in the bitmap information are mapped to a sequence of an identifier of the one or more DRBs for the duplication.

4. The method of claim 1, wherein the duplication is associated with an ultra-reliable low latency communication (URLLC), and
wherein a preferred path of the one or more DRBs for the duplication is configured based on a logical channel identity.

5. A method performed by a base station in a wireless communication system, the method comprising:
configuring one or more data radio bearers (DRBs) for duplication through a radio resource control (RRC) message for a terminal; and
transmitting, to the terminal, a medium access control (MAC) control element (CE) including bitmap information, the bitmap information indicating whether to activate or deactivate a duplication of at least one DRB,
wherein the duplication of the at least one DRB among the one or more DRBs is activated or deactivated based on bits included in the bitmap information for the duplication configured based on the RRC message,
wherein, in case that the MAC CE indicates a deactivation of the duplication of the at least one DRB, the terminal receives a negative acknowledgement (NACK) for a radio link control (RLC) protocol data unit (PDU) or an MAC PDU stored in a buffer of the at least one DRB in which the deactivation of the duplication is indicated, and a transmission mode for the at least one DRB is an RLC acknowledged mode (AM), the RLC PDU or the MAC PDU is received from the terminal, wherein the bitmap information consists of one byte field, and wherein each bit included in the one byte field is mapped to an identifier of the at least one DRB for the duplication.

6. The method of claim 5, wherein, in case that a successful transmission of a packet is identified in a link configured through a carrier aggregation (CA) or dual connectivity (DC) and the MAC CE indicates the deactivation of the duplication, a duplicated packet corresponding to the packet is discarded in the terminal.

7. The method of claim 5, wherein the bits included in the bitmap information are mapped to a sequence of an identifier of the one or more DRBs for the duplication.

8. The method of claim 5, wherein the duplication is associated with an ultra-reliable low latency communication (URLLC), and wherein a preferred path of the one or more DRBs for the duplication is configured based on a logical channel identity.

9. A terminal in a wireless communication system, the terminal comprising:

a transceiver; and a controller configured to:

configure one or more data radio bearers (DRBs) for duplication through a radio resource control (RRC) message from a base station, receive, from the base station via the transceiver, a medium access control (MAC) control element (CE) including bitmap information, the bitmap information indicating whether to activate or deactivate a duplication of at least one DRB, activate or deactivate the duplication of the at least one DRB among the one or more DRBs based on bits included in the bitmap information for the duplication configured based on the RRC message, in case that the MAC CE indicates a deactivation of the duplication of the at least one DRB, the terminal receives a negative acknowledgement (NACK) for a radio link control (RLC) protocol data unit (PDU) or an MAC PDU stored in a buffer of the at least one DRB in which the deactivation of the duplication is indicated, and a transmission mode for the at least one DRB is an RLC acknowledged mode (AM), transmit the RLC PDU or the MAC PDU, wherein the bitmap information consists of one byte field, and wherein each bit included in the one byte field is mapped to an identifier of the at least one DRB for the duplication.

10. The terminal of claim 9, wherein the controller is configured to:

in case that a successful transmission of a packet is identified in a link configured through a carrier aggregation (CA) or dual connectivity (DC) and the MAC CE indicates the deactivation of the duplication, discard a duplicated packet corresponding to the packet.

11. The terminal of claim 9, wherein the bits included in the bitmap information are mapped to a sequence of an identifier of the one or more DRBs for the duplication.

12. The terminal of claim 9, wherein the duplication is associated with an ultra-reliable low latency communication (URLLC), and wherein a preferred path of the one or more DRBs for the duplication is configured based on a logical channel identity.

13. A base station in a wireless communication system, the base station comprising:

a transceiver; and a controller configured to:

configure one or more data radio bearers (DRBs) for duplication through a radio resource control (RRC) message for a terminal, and transmit, to the terminal via the transceiver, a medium access control (MAC) control element (CE) including bitmap information, the bitmap information indicating whether to activate or deactivate a duplication of at least one DRB, wherein the duplication of the at least one DRB among the one or more DRBs is activated or deactivated based on bits included in the bitmap information for the duplication configured based on the RRC message, wherein, in case that the MAC CE indicates a deactivation of the duplication of the at least one DRB, the terminal receives a negative acknowledgement (NACK) for a radio link control (RLC) protocol data unit (PDU) or an MAC PDU stored in a buffer of the at least one DRB in which the deactivation of the duplication is indicated, and a transmission mode for the at least one DRB is an RLC acknowledged mode (AM), the RLC PDU or the MAC PDU is received from the terminal, wherein the bitmap information consists of one byte field, and wherein each bit included in the one byte field is mapped to an identifier of the at least one DRBs for the duplication.

14. The base station of claim 13, wherein, in case that a successful transmission of a packet is identified in a link configured through a carrier aggregation (CA) or dual connectivity (DC) and the MAC CE indicates the deactivation of the duplication, a duplicated packet corresponding to the packet is discarded in the terminal.

15. The base station of claim 13, wherein the bits included in the bitmap information are mapped to a sequence of an identifier of the one or more DRBs for the duplication.

16. The base station of claim 13, wherein the duplication is associated with an ultra-reliable low latency communication (URLLC), and wherein a preferred path of the one or more DRBs for the duplication is configured based on a logical channel identity.

* * * * *